INVENTOR
B. G. GRAY
BY Francis B. Henry
ATTORNEY

INVENTOR
B. G. GRAY
BY Francis B. Henry
ATTORNEY

INVENTOR
B. G. GRAY
BY Francis B Henry
ATTORNEY

INVENTOR
B. G. GRAY
BY Francis B. Henry
ATTORNEY

INVENTOR
B. G. GRAY
BY Francis B. Henry
ATTORNEY

INVENTOR
B. G. GRAY
BY
Francis B. Henry
ATTORNEY

INVENTOR
B. G. GRAY
BY Francis B. Henry
ATTORNEY

Dec. 15, 1970 B. G. GRAY 3,547,624

METHOD OF PROCESSING METAL-BEARING CHARGE IN A FURNACE HAVING OXY-FUEL BURNERS IN FURNACE TUYERES

Filed Dec. 16, 1966 16 Sheets-Sheet 8

INVENTOR
B. G. GRAY
BY Francis B Henry
ATTORNEY

INVENTOR
B. G. GRAY
BY Francis B. Henry
ATTORNEY

INVENTOR
B. G. GRAY
BY Francis B. Henry
ATTORNEY

INVENTOR
B. G. GRAY
BY Francis B. Henry
ATTORNEY

INVENTOR
B. G. GRAY
BY Francis B. Henry
ATTORNEY

INVENTOR
B. G. GRAY
BY Francis B. Henry
ATTORNEY

INVENTOR
B. G. GRAY
BY Francis B. Henry
ATTORNEY

INVENTOR
B. G. GRAY
BY Francis B. Henry
ATTORNEY

INVENTOR
B. G. GRAY
BY Francis B Henry
ATTORNEY 3,547,624

Patented Dec. 15, 1970

3,547,624

METHOD OF PROCESSING METAL-BEARING CHARGE IN A FURNACE HAVING OXY-FUEL BURNERS IN FURNACE TUYERES

Bronis G. Gray, Orange, N.J., assignor to Air Reduction Company, Incorporated, New York, N.Y., a corporation of New York Filed Dec. 16, 1966, Ser. No. 602,381
Int. Cl. C21b 5/00, 7/16; C22b 7/00
U.S. Cl. 75—42 10 Claims

ABSTRACT OF THE DISCLOSURE

Industrial processes for melting and smelting metals in a shaft-type furnace, in which oxy-fuel burners are introduced into the walls of the furnace adjacent the combustion zone. The process may be applied by introducing the burners either into the furnace tuyeres to operate in concert with blast air, or directly into the furnace walls when no blast air is used. It is applied primarily to melting and smelting iron, and also the processing of other metals, such as copper, lead, and antimony. Each of the burners, which may either be of the rocket or self-atomizing tip-mixer type, post-mixes a plurality of high velocity streams of commercially pure oxygen with one or more streams of oil or gas fuel, so that combustion takes place in the tuyere or burner barrel, in a single, homogeneous, high velocity coherent flame having an established combustion zone which originates at and is seated in the burner.

This invention relates in general to industrial melting and smelting processes and more particularly to techniques and arrangements for using tuyere burners in various types of shaft furnaces for processing metals.

In melting iron and steel in cupolas, and smelting ore containing iron and other metals in blast furnaces, the economics of the processes and the quality of their products are functions of the rates and temperatures of the melting and smelting operations.

The cupola, for example, is designed to melt pig iron and steel scrap, using coke as fuel, to produce molten castings. Changes in the melting rate, temperature, and composition of the product can be made by proper manipulation of the charge, fuel, and air blast.

In the prior art, various attempts have been made to reduce the consumption of coke and to increase the proportion of steel scrap used in place of more expensive pig iron in the charge by supplying low cost units of heat directly to the combustion area of the furnace, by the expedient of placing burners in the furnace tuyeres. The use of burners in the prior art manner has been only partially successful, inasmuch as these burners are designed to operate with relatively low velocity flames sustained by air, or slightly enriched air, containing insufficient oxygen to effect a complete combustion of the burner fuel in an established combustion zone in the burner tuyere. A particular disadvantage of such an arrangement is that a substantial amount of nitrogen remains after the combustion, in addition to certain undesired combustion products, including water vapor, which cool the flame and carry combustion heat up the stack. Another disadvantage of prior art tuyere burner arrangements is that the combustion products are not properly mixed before entering the furnace, thereby producing an uneven unpredictable effect on the melting or smelting processes. A further disadvantage is that after shutdown or in starting up, the temperature and melting rate in the furnace increases very slowly. Another disadvantage in the prior art operation of melting and smelting processes is that the temperature in the furnace is often insufficient to prevent the formation of what are known in the art as "bridges" and "skulls," the former arising when pieces of scrap become fused in the cupola stack and the latter arising when molten metallics solidify and form accretions within the shaft.

Accordingly, it is a general object of the present invention to improve the melting of iron, steel, and other metals or smelting their ores in shaft furnaces by substantially increasing the rate at which charge is consumed, and substantially increasing the metal or ore-to-coke ratio.

A more particular object of the present invention is to increase the melting or smelting rate and to increase the temperature in the furnace.

Another object is to provide techniques which require the use of less expensive charge materials, such as steel scrap instead of pig iron and silicon dioxide in place of higher priced silicon alloys.

Another object of the invention is to improve the chemical composition of the product, and render the same subject to more exact control, by increasing the uniformity and predictability of the process.

Other objects of the invention are to increase the slag fluidity and decrease the tendency for the formation of bridges and skulls in the furnace.

These and other objects are realized in improved techniques for melting and smelting iron and other metals in accordance with the present invention in a shaft furnace having a plurality of tuyeres adjacent the hearth portion which are equipped with inwardly directed oxy-fuel burners. A salient feature of the tuyere burners of the present invention is that combustion takes place in an established combustion zone in the tuyeres, in the form of a single, homogeneous, coherent, high velocity, high temperature flame adjacent to or seated at the end of the burner which creates a high degree of turbulence inside of the tuyeres mixing the combustion products into a substantially homogeneous stream.

These burners are supplied with streams of fuel comprising hydrocarbon fluid surrounded with high velocity streams of commercially pure oxygen, the latter at a mass flow rate of from one-quarter to twice the stoichiometric requirement for complete combustion of the fuel. Together, these streams produce flames having temperatures of from 3,000 to 5,000 degrees Fahrenheit and flame velocities within the range 500 to 3,500 feet per second, which flames are adapted to remain seated in the mouth of the burner, conforming to an established combustion zone in the tuyere, notwithstanding the presence of inwardly directed, surrounding air blasts having velocities of between 150 and 1,000 feet per second in the tuyere. In these cases where combustion is well established within either the burner or the tuyere, flame velocity is defined as the arithmetic mean of the oxygen and fuel free stream velocities measured in the plane of the inner end of the tuyere.

In one specific embodiment of the invention described hereinafter, which relates to the making of molten iron in a cupola, a plurality of furnace tuyeres were equipped with oxy-oil water-cooled burners comprising self-atomizing tip mixers. These were supplied with streams of fuel oil (A.S.T.M. grade 2) and high velocity streams of commercially pure oxygen, the latter in an amount representing 65 percent or more of the stoichiometric requirement for complete combustion of the oil. These arrangements produced a single coherent homogenous flame in each of the burner tuyeres having flame velocities of between 500 and 1,500 feet per second, and flame temperatures within the range 4,000 to 5,000 degrees Fahrenheit, which were stable in wind velocities up to 500 feet per second flowing through the tuyeres. Under these arrangements the melting rate of charge supplied to the cupola was increased 90 percent. The burner tips were withdrawn from the ends of the tuyeres so that complete combustion took place in an established combustion zone in each of the tuyeres.

In another embodiment in accordance with the invention, water cooled rocket burners were employed in the tuyeres of the iron melting cupola. These latter burners were supplied with commercially pure oxygen and natural gas, having a heating value of approximately 1,000 British thermal units per cubic foot, at an oxy-fuel ratio of 1.5:1, the oxygen being 75 percent of the stoichiometric requirement for complete combustion of the natural gas fuel. This embodiment is also characterized in each burner by a homogeneous high velocity seated flame, notwithstanding high wind velocities, and showed an increase over prior art techniques in the melting rate of the charges supplied to the cupola, which was a substantial improvement over the prior art, although less pronounced than that achieved with the oil fuel.

In accordance with additional modifications disclosed hereinafter, the principles of the invention are also applied to the smelting of ores comprising a principal component of iron and other metals, such as copper, lead, and antimony, in blast furnaces wherein burners, also of a high-velocity flame type, are installed for these applications in the furnace tuyeres or at the level of the combustion zone in the furnace. In each case, a single high velocity, high temperature oxy-fuel flame is employed, total combustion taking place in an established zone in the tuyere, or furnace barrel.

The particular advantages to be derived from employing oxy-fuel furnace burners with homogeneous high velocity coherent flames in melting and smelting furnaces in the manner disclosed in detail in the specification hereinafter and the attached drawings are:

(1) Higher metal temperatures are produced; and the melting rate is increased.

(2) The uniformity and predictability of the process is increased.

(3) The coke consumption in the furnace is decreased.

(4) More economical types of charge can be employed in the processes. For example, in the iron melting cupola, scrap steel can readily be substituted for more expensive pig iron, and silicon dioxide substituted for more expensive silicon alloys.

(5) The product is improved and the composition is more readily controlled. In the iron melting cupola, for example, the carbon pick-up is increased, whereas the sulfur pick-up is decreased. and silicon and manganese losses are decreased. In the smelting process, the chemical composition of the combustion products of the burner flame can be carefully controlled to facilitate the reduction process.

(6) The actual functioning of the furnaces is improved by increased slag fluidity and lessened tendency for the formation of "bridges" and "skulls."

These and other objects, features, and advantages will be apparent to those skilled in the art from a study of the detailed specifications hereinafter with reference to the attached drawings, in which.

Figure 1:
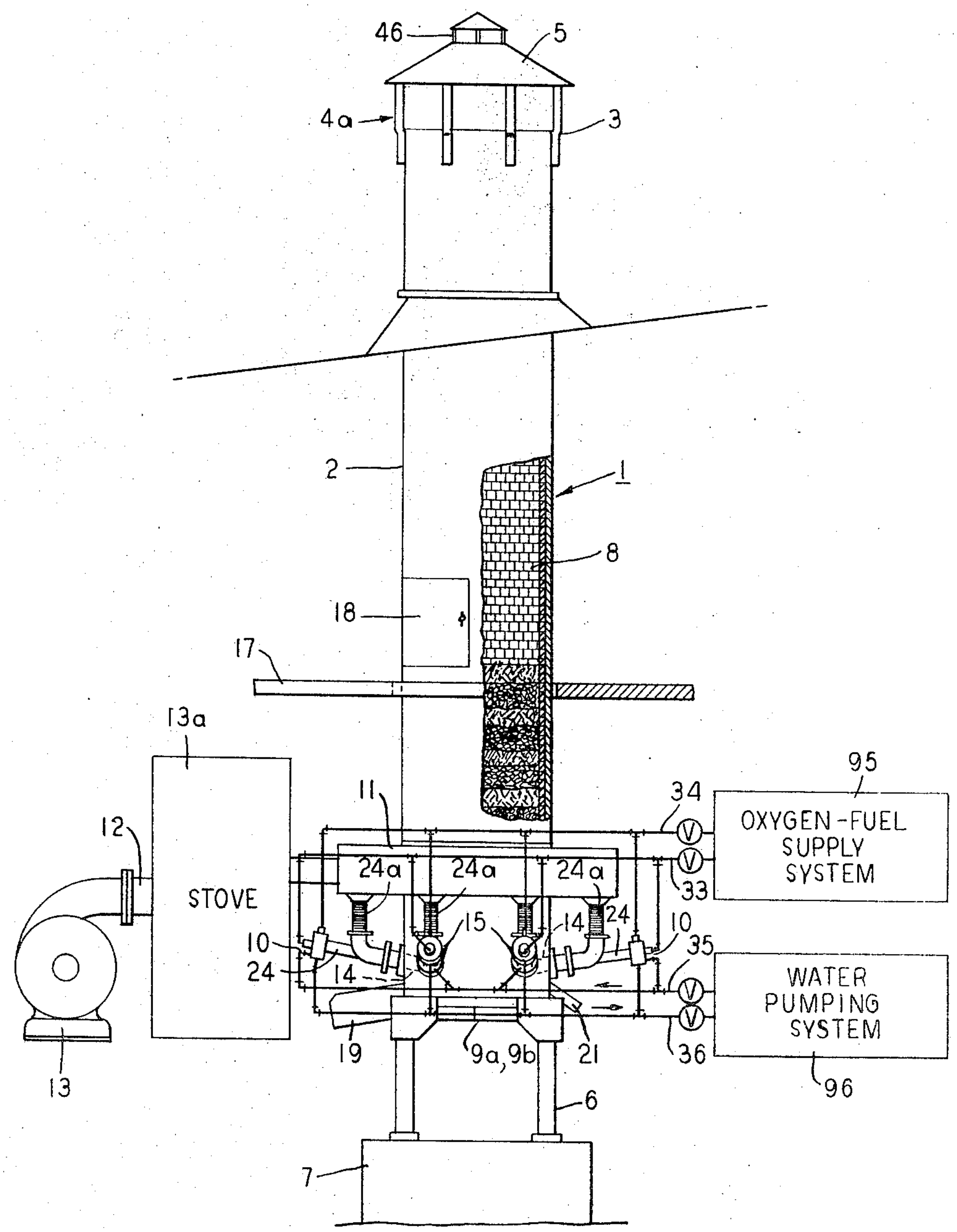
FIG. 1 shows, partly in sectioned front elevation and partly in schematic, a system including an iron melting cupola modified to include oxy-fuel burners in accordance with the present invention.
Figures 3A, 3B, 8C:
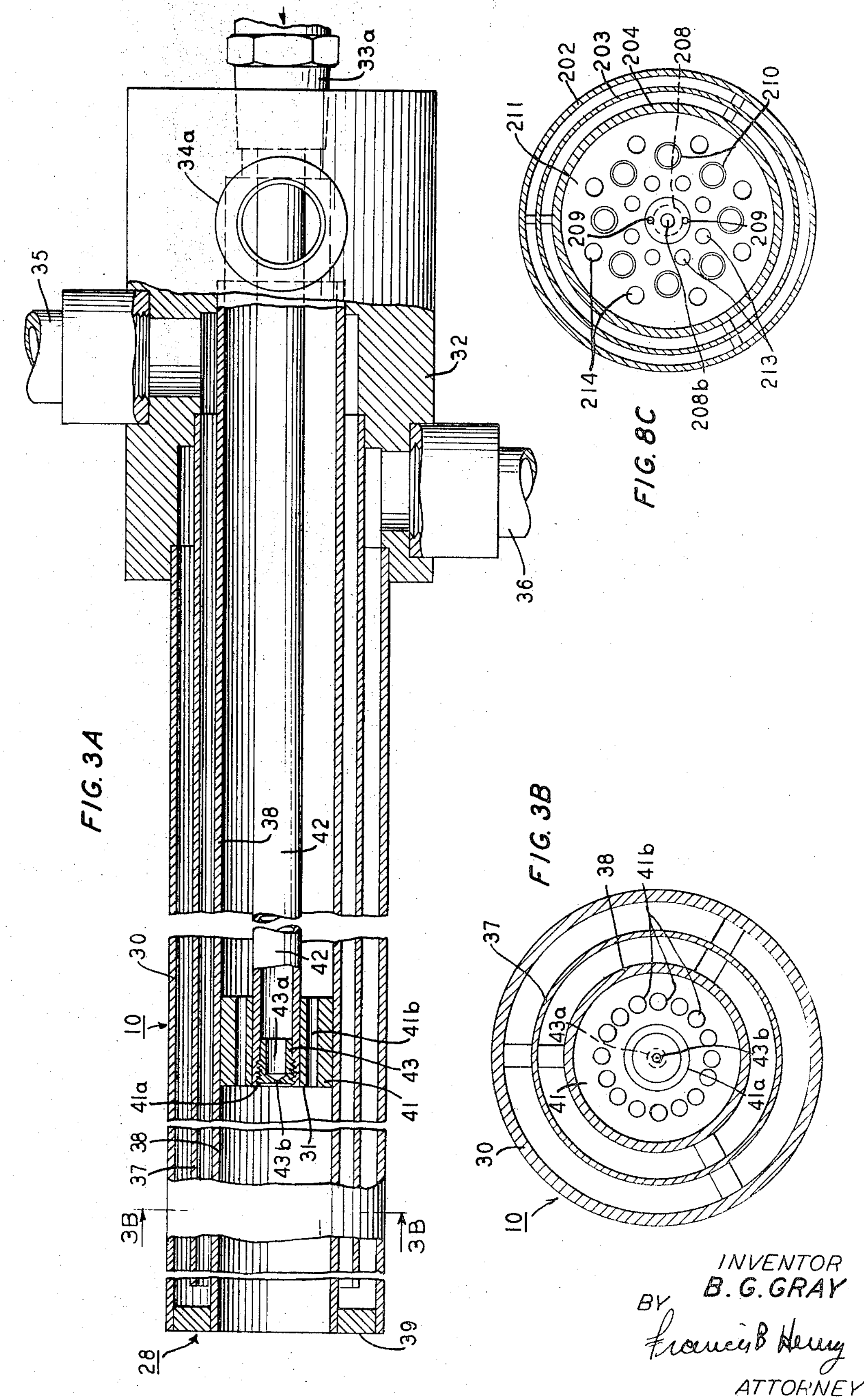
FIGS. 3A and 3B show, in longitudinal section and in cross section respectively, a self-atomizing tip mixer type of oxy-oil burner for use in accordance with the present invention.
Figures 6A, 6B:
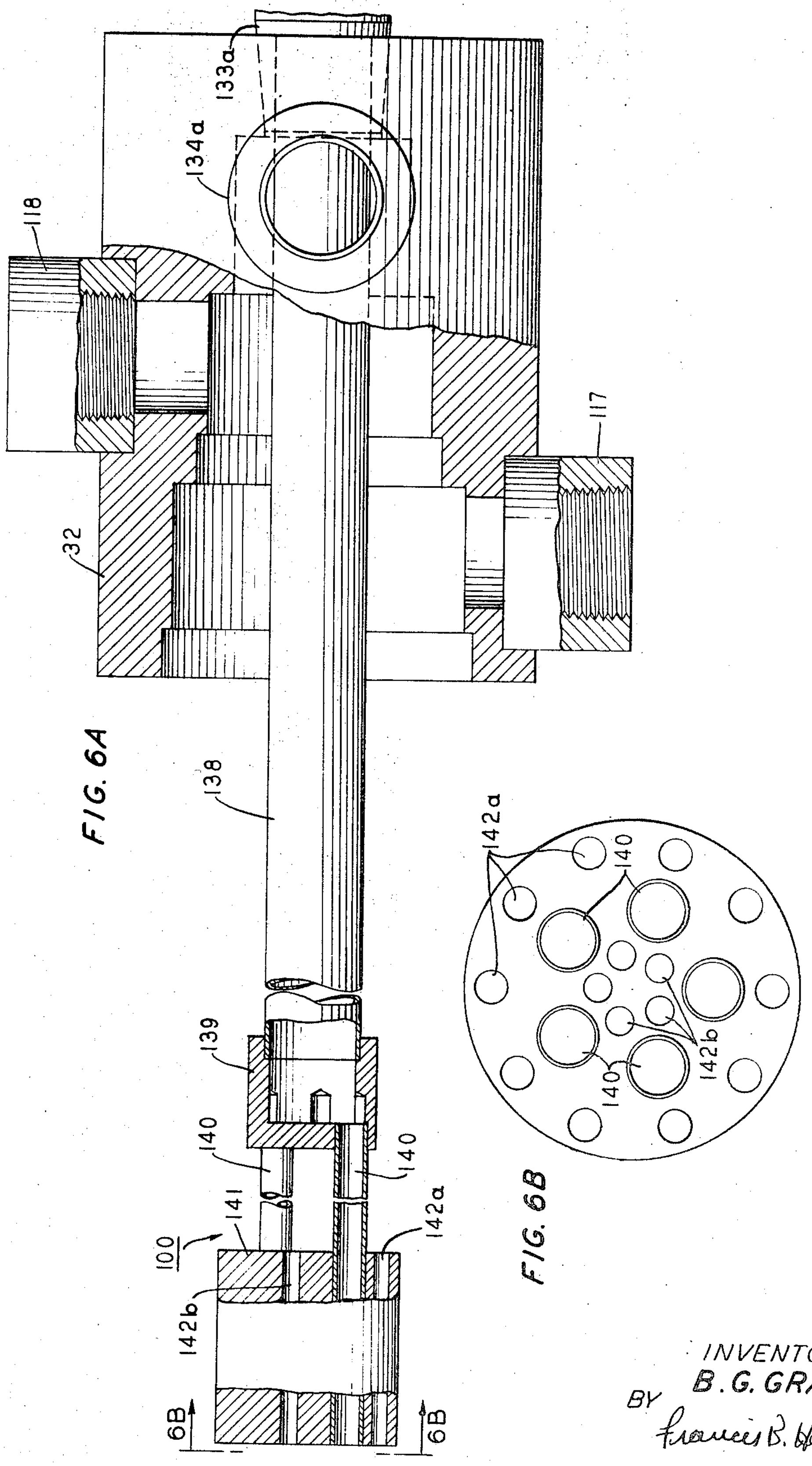
FIGS. 6A and 6B show an oxy-gas rocket burner insert for modification of the burner combination shown in FIGS. 3A, 3B.
Figure 8A:
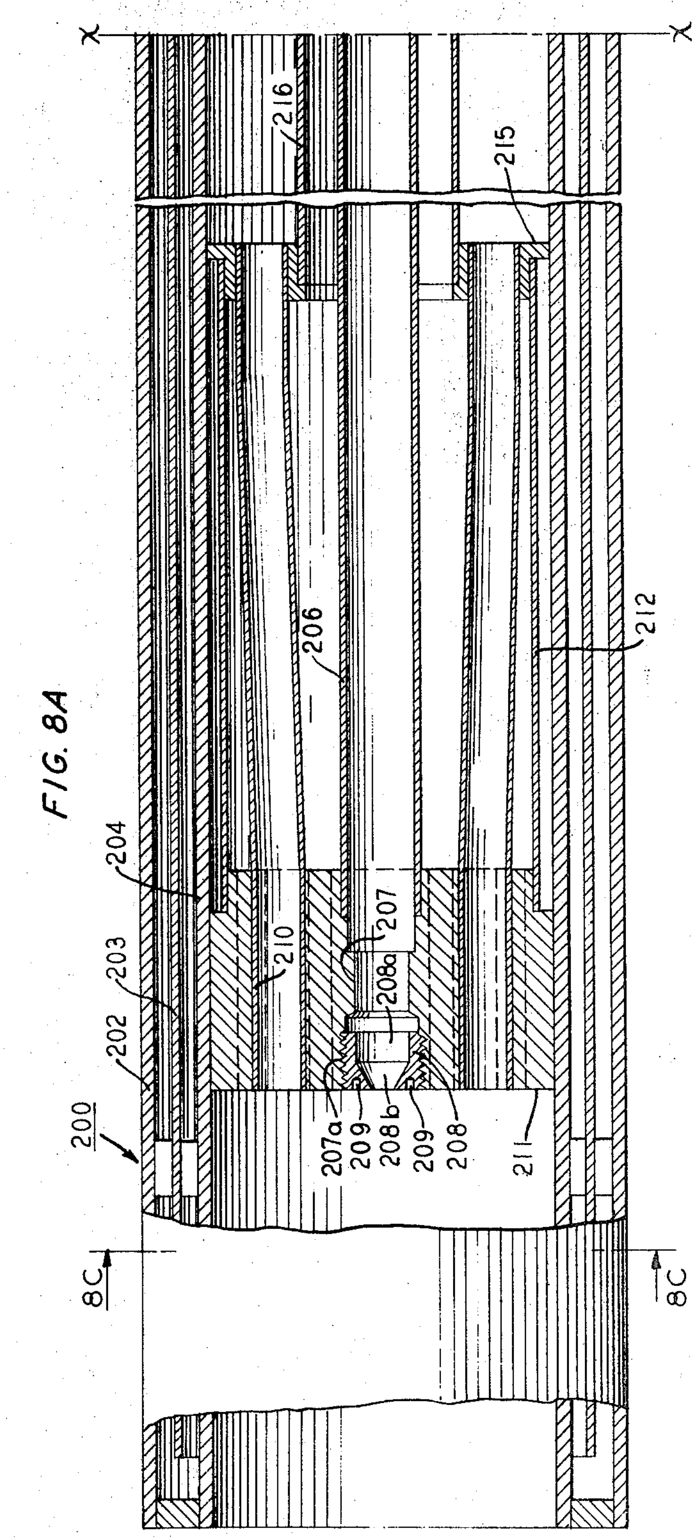
Figure 8B:
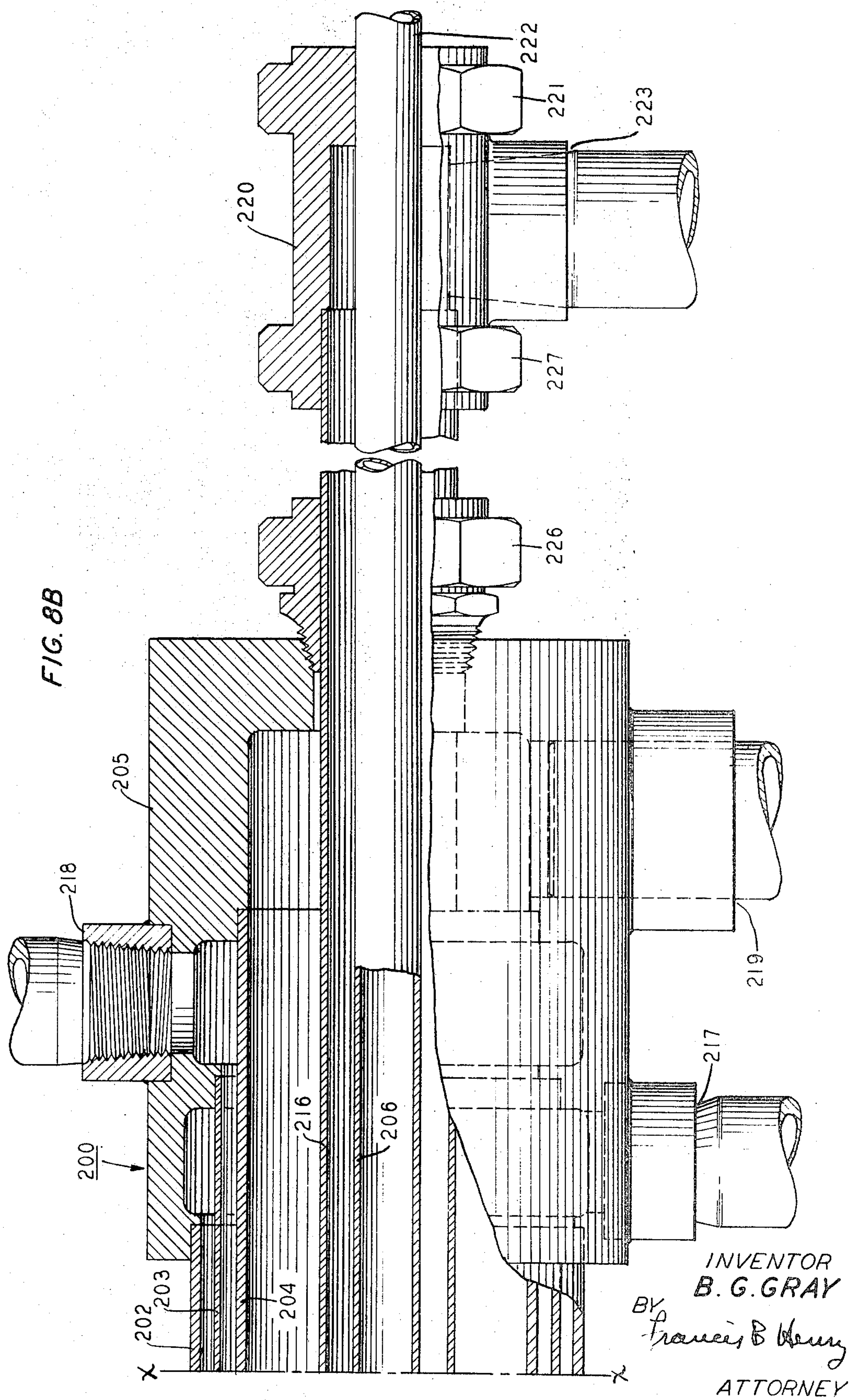
Figure 9:
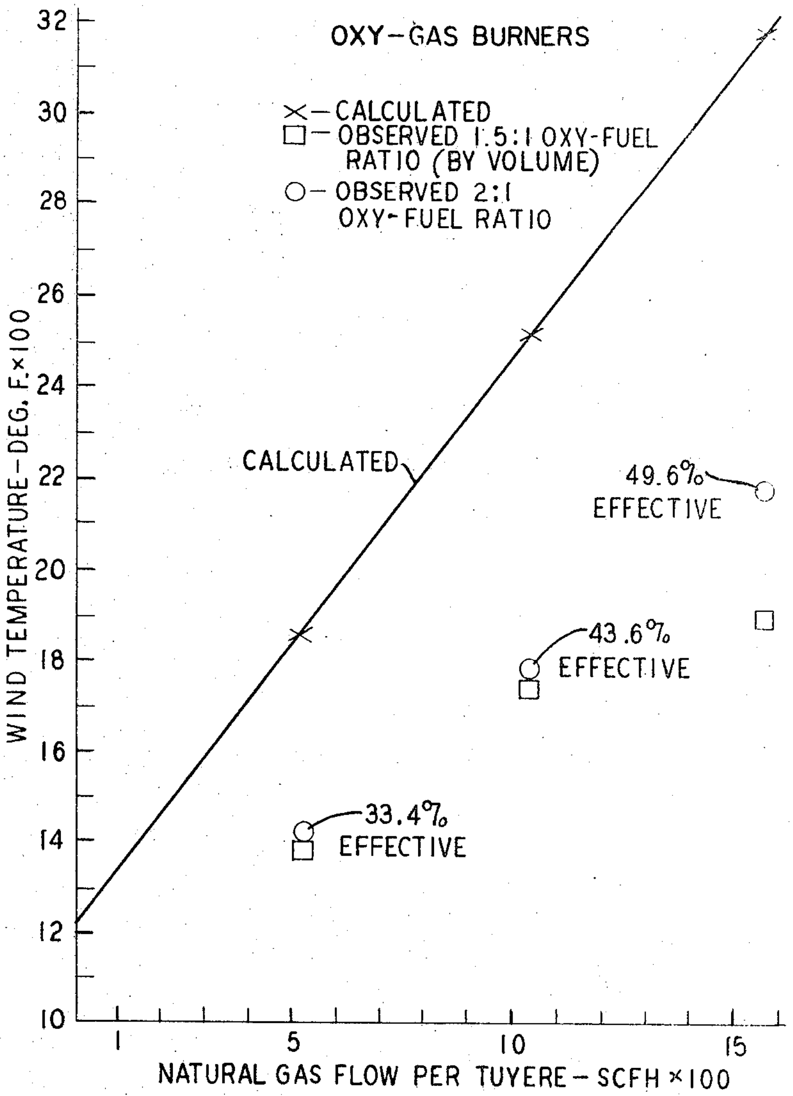
Figure 12:
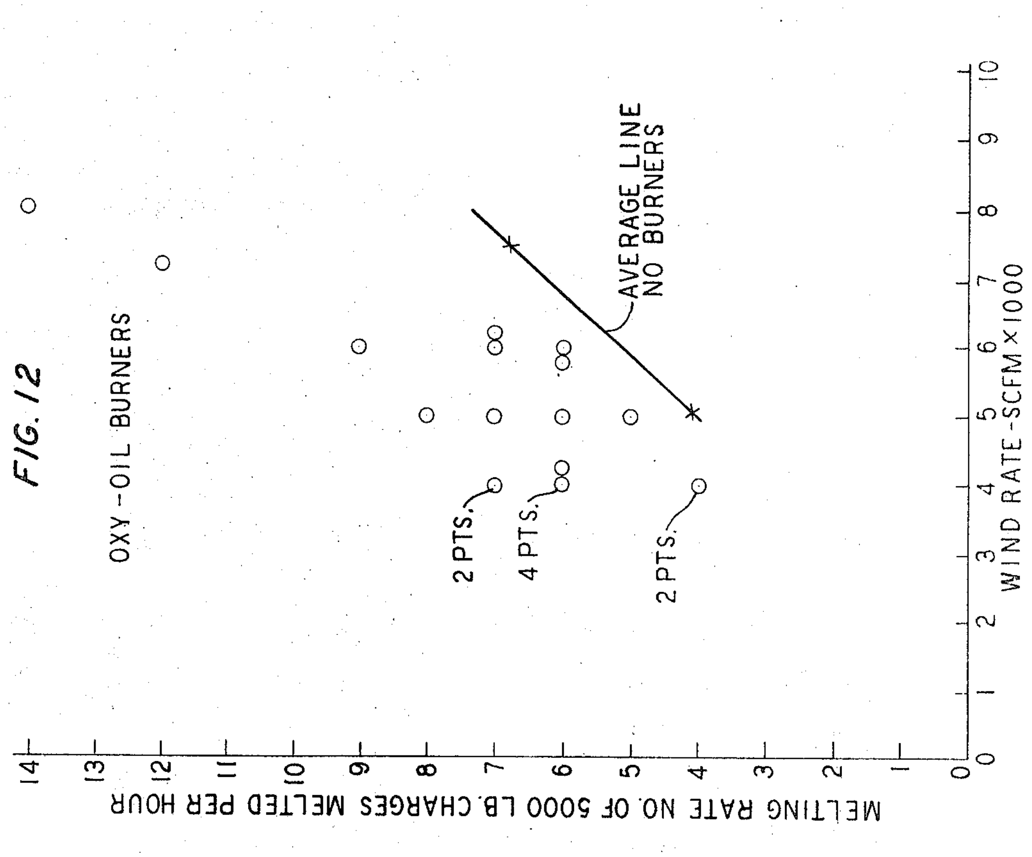
Figure 10:
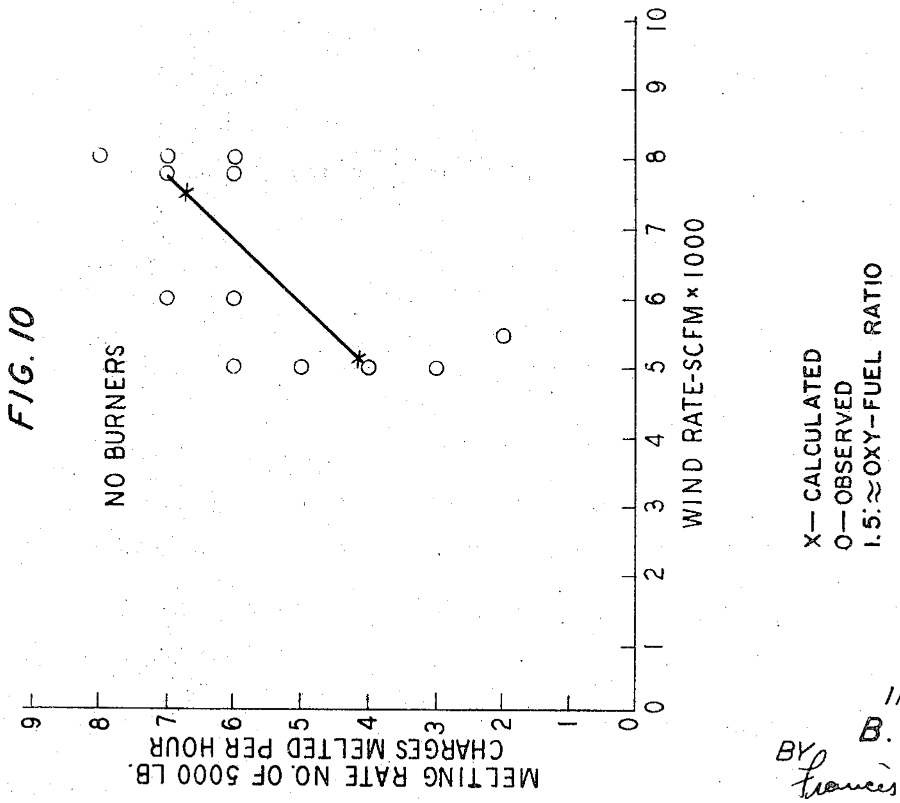
Figure 11:
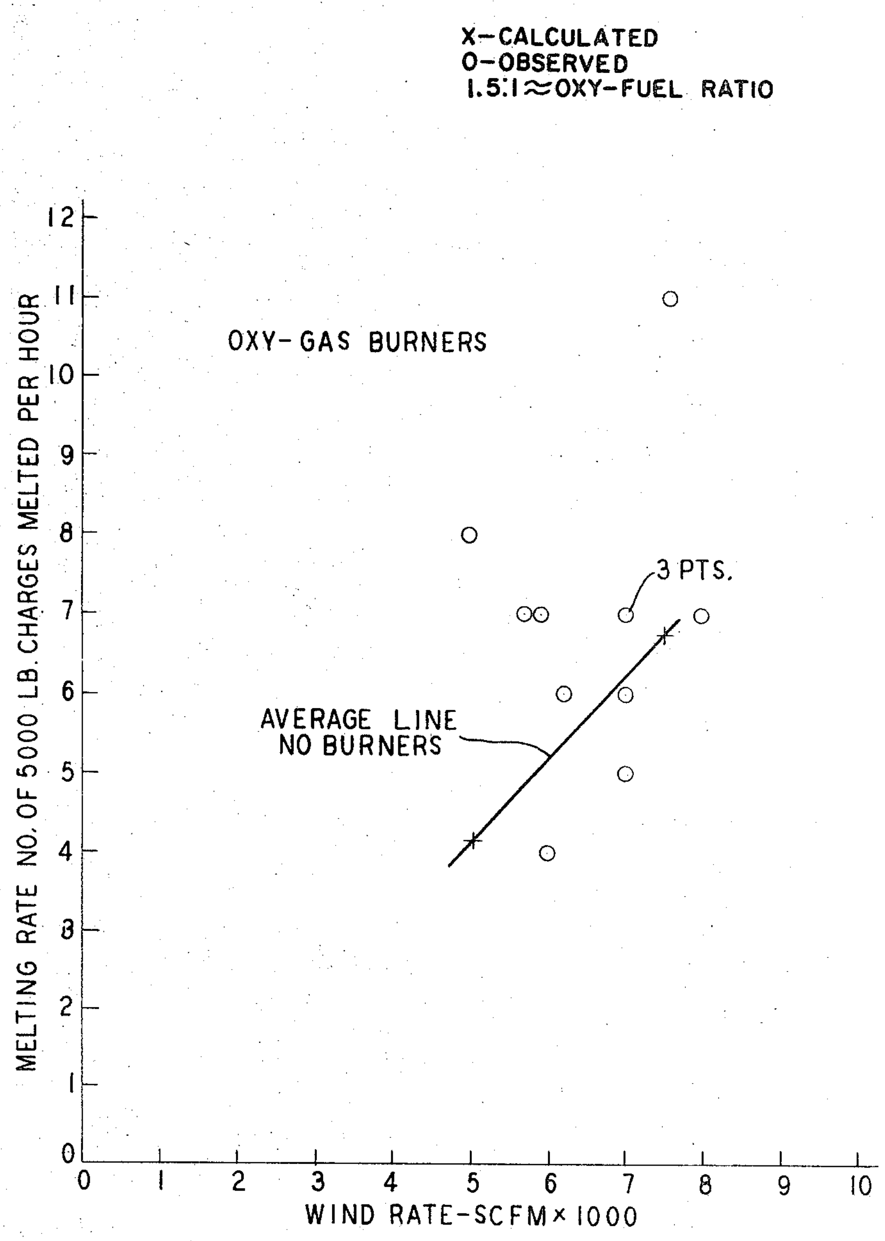
Figure 13A:
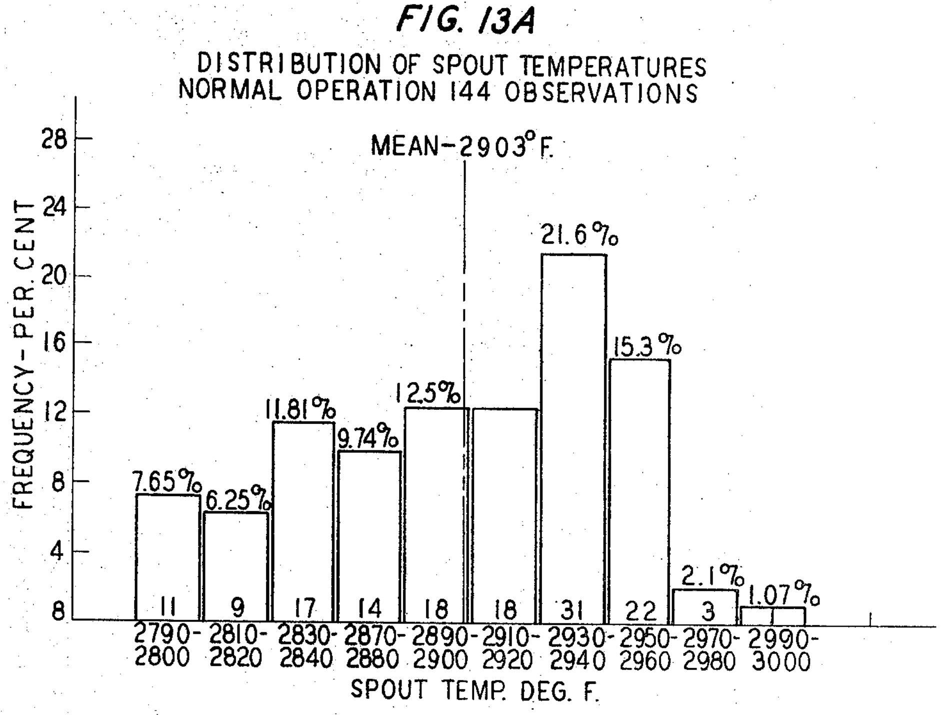
Figure 13B:
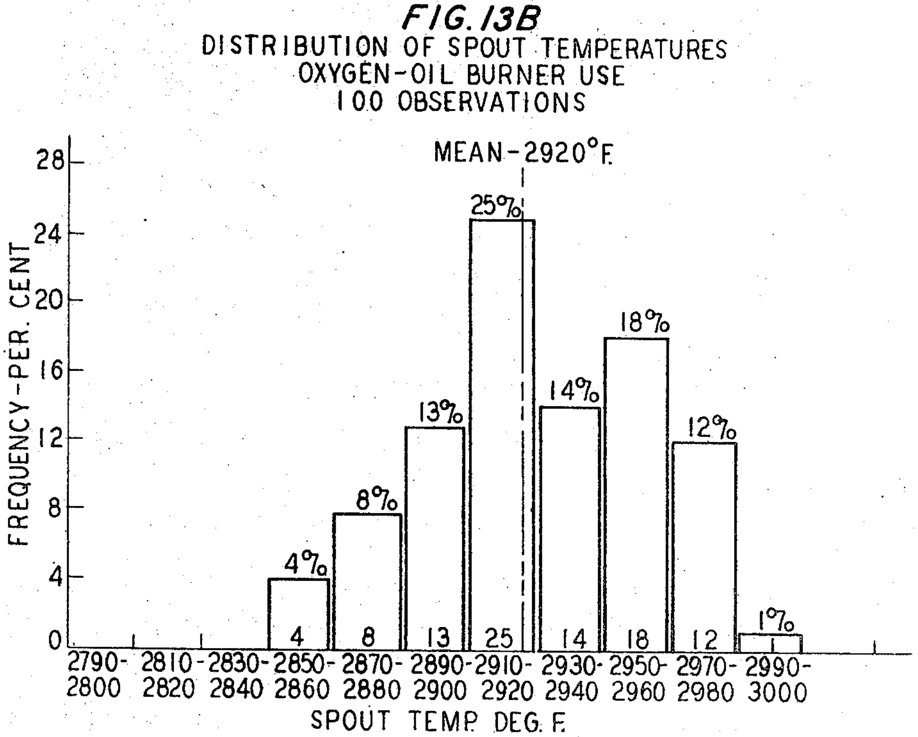
Figure 14:
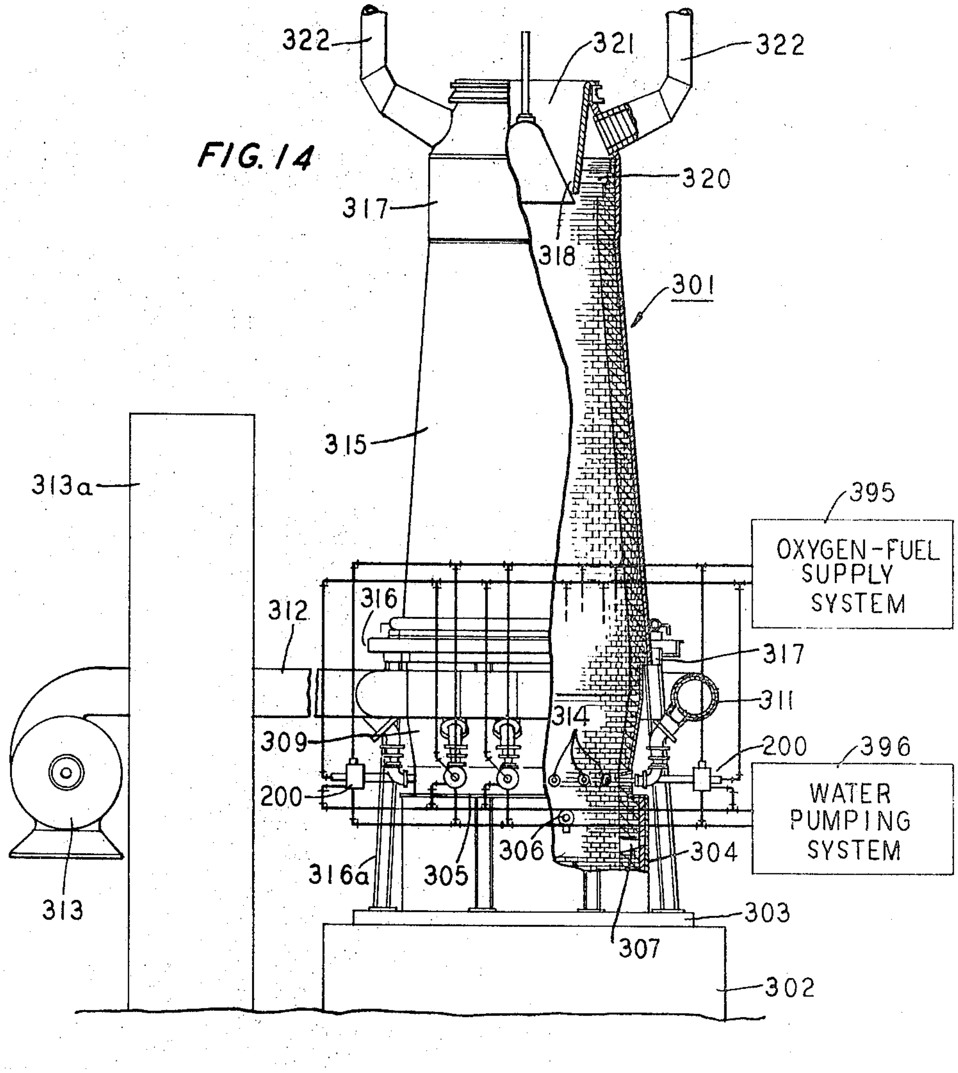
Figure 15:
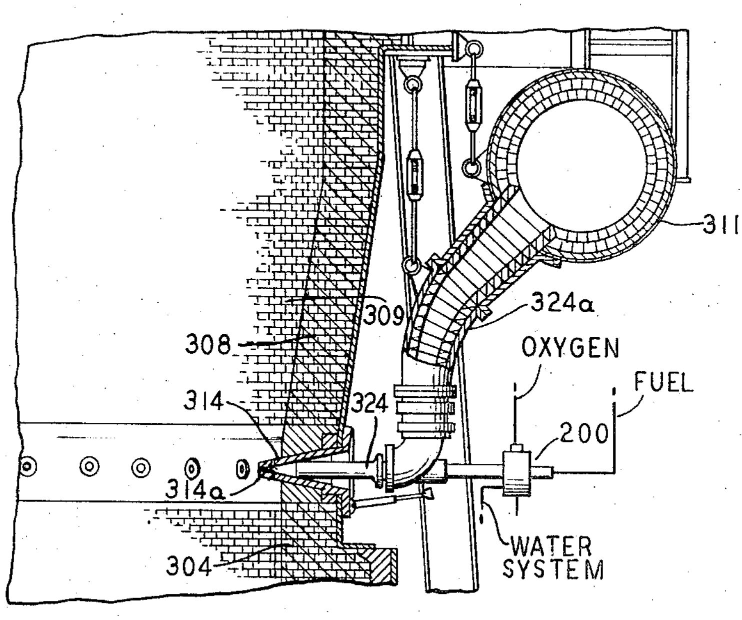
Figure 16:
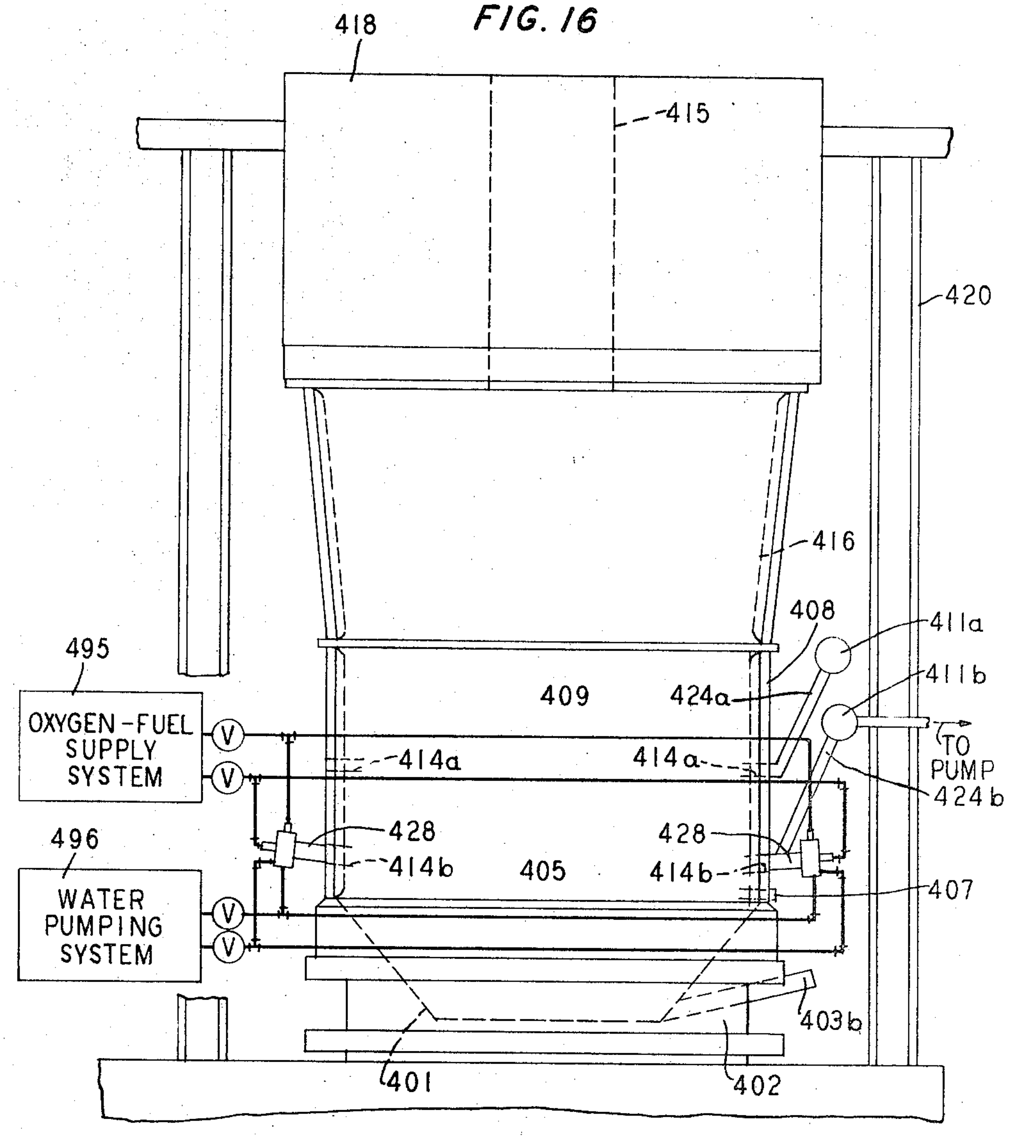
Figure 17:
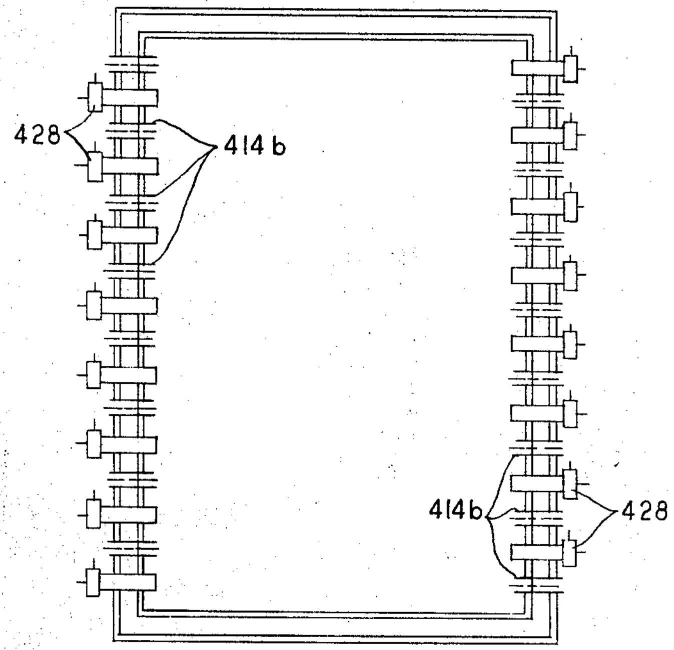
Figure 18:
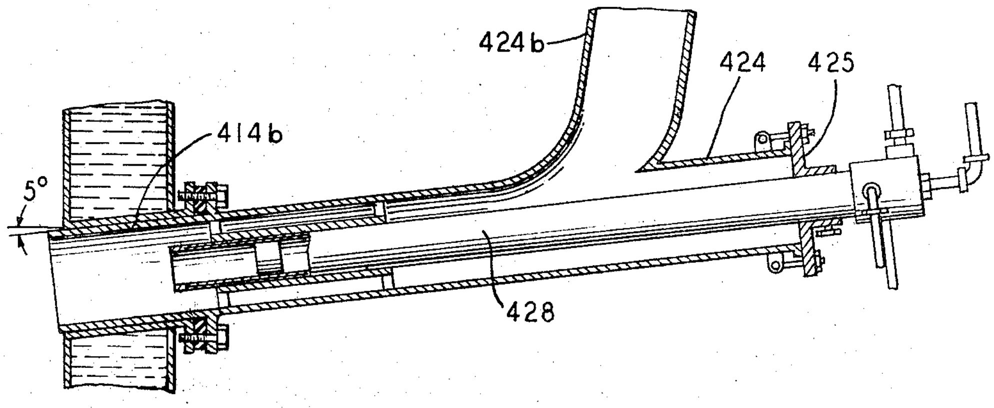
Figure 19A:
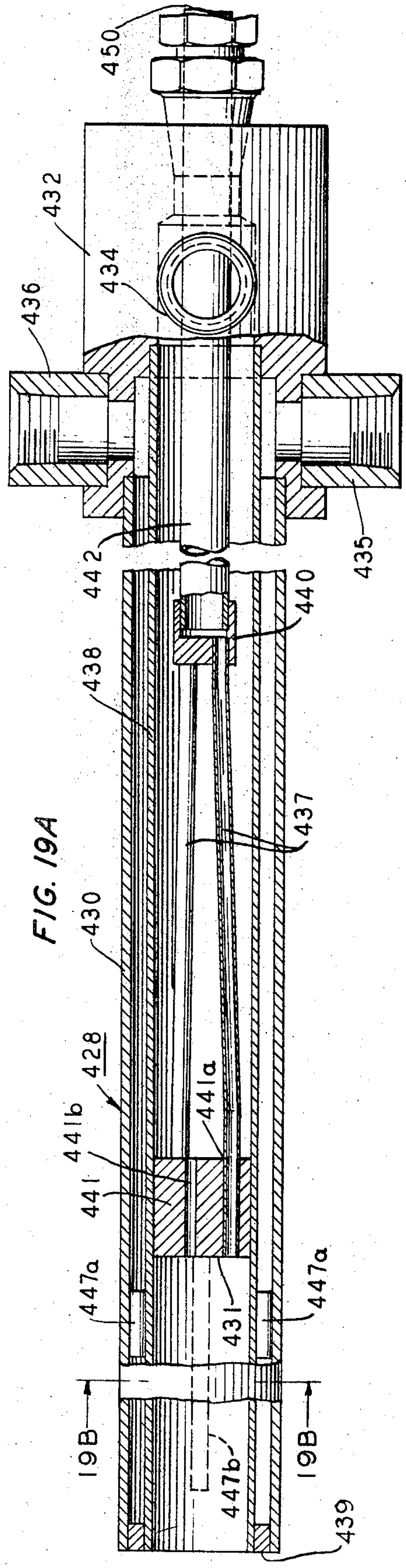
Figure 19B:
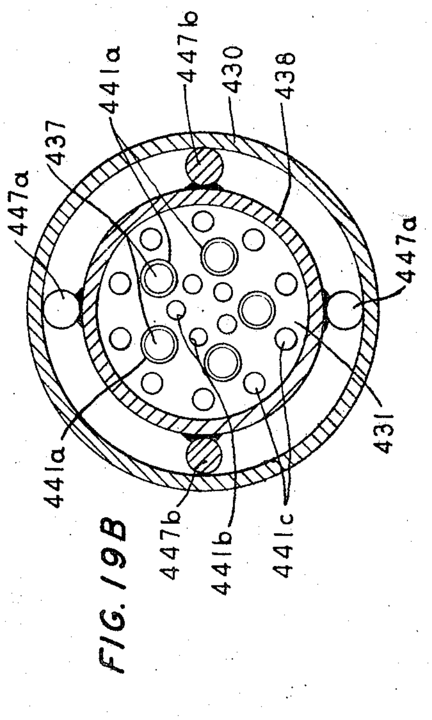

FIGS. 8A and 8B, combined along their lines x–x, show in longitudinal section an oxygen-fuel rocket burner for alternative employment in the arrangements of FIG. 1 of the present invention;

FIG. 8C is a cross sectional showing of the burner of FIGS. 6A, 6B;

FIG. 9 shows the relation between observed wind heating by an oxy-gas burner in a tuyere and calculated values;

FIG. 10 shows a plot of melting rate as measured by charges consumed per hour versus wind rate for a cupola operating without burners in accordance with prior art practice;

FIG. 11 shows a similar plot of melting rate versus wind rate for a cupola operating with oxy-fuel burners in accordance with the present invention, employing high gas flows;

FIG. 12 shows a similar plot of melting rate versus wind rate for a cupola operating with oxy-oil burners in accordance with the present invention;

FIGS. 13A and 13B are a comparison of the distributions of spout temperatures for normal operation of a cupola and operation including oxy-oil burners in accordance with the present invention;

FIG. 14 shows, partly in front elevation and partly in schematic, a system including an iron ore smelting blast furnace modified to include oxy-fuel burners in accordance with the present invention;

FIG. 15 shows in enlarged cross section a tuyere and surrounding area in the blast furnace of FIG. 14, indicating the oxy-fuel burner location in accordance with the present invention;

FIG. 16 shows, partly in longitudinal section and partly in schematic, a rectangular blast furnace, suitable for the smelting of ore containing lead or antimony, including oxy-fuel burners in accordance with the present invention;

FIG. 17 shows in plan view the location of the tuyere burners in the lead blast furnace of FIG. 16;

FIG. 18 shows, in enlarged longitudinal section, the location of an oxy-fuel burner in one of the tuyeres of the lead blast furnace of FIG. 16; and FIGS. 19A, 19B show, in longitudinal section and cross-section, respectively, typical rocket burners suitable for use in the tuyeres of the lead blast furnace of FIG. 16.

Referring to FIG. 1 of the drawings, there is shown a conventional hot blast iron melting cupola 1 (water jacket not shown) which is one of the types of furnaces suitable for application of the oxy-fuel tuyere burners in the manner of the present invention.

The specific cupola shown for purposes of the present illustration comprises a cylindrical steel shell 2, which is 90 inches in outer diameter. The shell 2 consists of heavy steel plates, rolled into cylindrical sections, and riveted, bolted, or welded together with downwardly lapping joints. The top of the stack 2 is reinforced with an angle-iron ring 3, which is riveted on in such a manner as to afford protection against rain seepage between the lining and the shell. The top of the stack generally extends to a minimum of 10 feet above the roof of the foundry and is sometimes carried further to provide for additional natural draft at the charging opening, or to provide additional space to permit complete combustion of the gases above the charged column. The angle-iron 3 supports a plurality of upwardly extending rods on which are mounted a conventional slant-roofed, perforated spark arrestor 5, which has an external annular opening 4*a*, a foot or so high, at the bottom, and a smaller annular opening 4*b* in the upper portion, for release of smoke and exhaust gases.

The lower, or body, section of the cupola is supported by four columns 6 and 8 feet high, mounted on a concrete foundation 7. The lower section is substantially constructed to give proper support to the load of the upper sections, since the total weight may be of the order of 136,000 pounds, or more, for a cupola, say 45 feet high. Shelf segments are bolted to the inside of the shell 2 at regularly spaced intervals for supporting a lining 8, about nine inches thick of fire-brick, in the illustrative "acid-lined" embodiment.

The cast iron bottom of the cupola, which in the present embodiment is 8 feet above the foundation level, is equipped with a pair of hinged drop doors 9*a*, 9*b*, which are used for removing coke from the cupola after the molten iron has been drained from it.

Fuel is supplied to the cupola 1 through a charging door 18, covering a rectangular opening in the cupola wall 2, roughly 7 feet by 10 feet, the bottom of which is located at a height of about 35 feet above the foundation level. Just below the level of charging door 18, the cupola is surrounded by a platform 17 for facility in charging the furnace.

Layers of fuel, such as coke, and iron bearing charge, such as scrap steel or pig iron, are fed into the furnace through charging door 18, forming alternate layers of coke and charge, the coke layer being approximately half the thickness of the metallic charges, to a level of about 27 feet above the foundation level of the cupola.

The hot gases rising in the cupola from combustion of the coke tend to melt the iron in the charge, which trickles down through the cupola and is withdrawn through a downwardly inclined spout 19, located about 10 feet above the foundation. Slag, which floats on top of the molten iron, is drawn off through slag spout 21, located at a level about 11 feet above the foundation of the cupola.

Surrounding the lower end of the cupola 1, at a level about 18 feet above the foundation, is an annular pipe of rectangular cross section known as the wind box 11, which in the present example is 180 inches in outer diameter, 120 inches in inner diameter, and 36 inches high. Wind box 11 is connected through an external conduit 12 to a conventional centrifugal blower 13, which is designed to furnish a continuous blast of air. In the present illustration a heating unit 13*a* is interconnected with conduit 13, for heating the blast up to a temperature of about 1200 degrees Fahrenheit, although it will be apparent that in other examples, other arrangements are contemplated, such as the use of blasts of lower temperatures, or cold blasts, or in some cases, no blast at all.

The blast of air carried in wind box 11 is admitted to the lower or body portion of the cupola through a plurality of tuyere openings 14, which may vary in size, shape and number from one iron melting cupola to another. In the example under description, tuyeres 14 are eight in number, and are symmetrically distributed around the circumference of the cupola wall at a horizontal level which is roughly 5 feet above the hearth level. Tuyeres 14 are cylindrical in form, having an inner diameter of 6 inches, are 30 inches long, and are downwardly inclined from the horizontal at an angle of roughly 12 degrees, as will be indicated in greater detail in the enlarged cross-sectional showing of FIG. 2. Each tuyere opening 14 is lined with a tuyere water-jacket pipe 14*a* of copper, which is 30 inches long, 11½ inches in outer diameter, and ½ inch thick. The pipe 14*a* concentrically surrounds an inner pipe 14*b* of copper, 7 inches in outer diameter and ½ inch thick. The two pipes 14*a*, 14*b* are welded or sealed together at their inner ends, and have a radial spacing between them of 2 inches, to accommodate water cooling of the tuyere passing in through a conventional water cooling system, entering and leaving the jacket through pipes 23*a*, 23*b*.

The end of the water jacket 14*a*, 14*b* of the tuyere pipe protrudes an axial distance of 16 inches from the inner face of the cupola wall into the interior of the cupola. The water jacket 14*a*, which has an overall length of about 34 inches, protrudes axially 16 inches from the outer face of the cupola wall, and terminates in an annular flange 15, to which is bolted the matching flange 21 at the inner end of tuyere extension pipe 24.

Flange 21 is 19 inches in outer diameter, about 6½ inches in inner diameter and ½ inch thick. It is sealed to flange 15 against a small intervening gasket 15*a*, by means of a plurality of bolts 22. Steel extension pipe 24, which has an inner diameter of 6 inches and an outer diameter of 6½ inches, extends outwardly from the junction of the flanges an overall distance of about 38 inches, so that the total outward-extending length from the inner end of the tuyere water jacket 14*a*, 14*b* to the outer end of pipe 24 is about 6 feet. Pipe 24 protrudes about 52 inches from the outer wall of the cupola. Centered about 21 inches from the outer end of pipe 24 is a downcomer arm 24*a*, about 6 inches in inner diameter and 6½ inches in outer diameter which executes a half circle, and passes up through a flexible expansion joint (not shown) to make connection to wind box 11 overhead.

In accordance with the present invention, in order to expedite the iron melting process in the cupola 1, and to supply more units of heat directly to the combustion area in substitution for bulky units of coke added through the charging door, oxy-fuel burners 10 are inserted into seven of the eight cupola tuyeres 14. These burners are each designed to generate a single, homogeneous, coherent, seated flame, having a flame velocity within the range 500 to 3500 feet per second, which produces flame temperatures within the range 4000 to 5000 degrees Fahrenheit, notwithstanding the presence in the tuyere pipes 24 of inwardly directed air blasts of between 150 and 500 feet per second.

Figure 2:
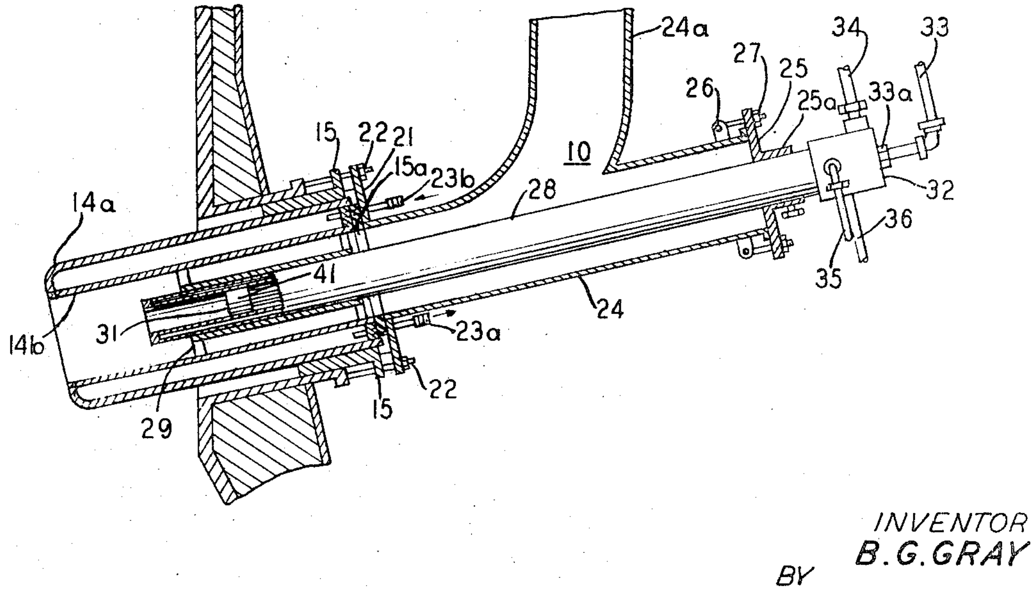
FIG. 2 shows in enlarged longitudinal section the location of an oxy-fuel burner in one of the tuyeres of the cupola of FIG. 1.

FIG. 2 shows, in enlarged section, one of the cupola tuyeres 14, including the tuyere extension pipe 24, and showing the position of a typical oxy-fuel burner 10 in the specific embodiment under description.

The tuyere extension pipe 24, which is disposed concentrically with the tuyere pipes 14*a*, 14*b*, abutting the latter, is held in place by a plurality of set screws 22 on the cover 21. Pipe 24 extends outwardly about 48 inches from its inner end and 8 inches from the downcomer 24*a*, and is closed at its outer end by an annular closure 25 of steel, which is 10 inches in outer diamter and 1 inch thick, and which is fastened at its outer periphery to a lug bracket 26, welded or brazed to the outer circumference of pipe 24 by a plurality of lugs 27. The closure 25 has at its central opening a nipple 25*a*, about two and one-half inches in inner diameter, in which is mounted concentrically the burner assembly 10, which will be presently described in detail with reference to FIGS. 3A, 3B. The inner end of burner assembly 10, including the water jacket 28, which is held in place by a conventional spider arrangement 29, is recessed, in the present example, a distance of about two inches from the corresponding inner end of the inner tuyere pipe 14*b*. The actual burner tip 31 may be further recessed so that its end is withdrawn about six inches inside of the water-jacket 28. However, as will be described in detail with reference to FIGS. 3A, 3B hereinafter, the position of burner assembly 10, including the water-jacket 28, is adjustable in the inner tuyere pipe 14*b* to any one of a number of different longitudinal positions, depending on the specific operation under description.

The outer end of burner assembly 10 terminates in burner body head 32, to which are connected the fuel feed line 33, the oxygen feed line 34, and the cooling water pipes 35 and 36 to water pumping system 96. The feed lines 33 and 34 are connected to the oxy-fuel supply system 95, which system and connecting conduits will be described in detail with reference to FIGS. 4 and 5, hereinafter.

Let us refer, now, to FIGS. 3A, 3B which are detailed longitudinal and cross-sectional showings of the self-atomizing tip mix burner, which is a preferred type employed in the practice of the present invention in a cupola for iron melting, such as shown in FIG. 1, since it provides for the development of a stable, homogeneous, high velocity oxy-oil flame, combustion being initiated in or taking place in an established combustion zone immediately adjacent the burner tip.

The outer pipe 30 of the burner assemblage 10, which includes the enclosing water jacket 28, is a hard-drawn, seamless brass tube 0.109 inch in wall thickness and 65⅜ inches long, having an outer diameter of two and one-half inches, which is disposed concentrically in the inner tuyere pipe 14*b* and the abutting extension pipe 24. Concentrically disposed inside of pipe 30, and terminating one-half inch from the inner end of the latter, is a second pipe 37, also of seamless brass tubing 0.065 inch in wall thickness, 66⅜ inches long, and two inches in outer diameter. A third pipe 38, also part of the water jacket is located concentrically inside of pipes 36 and 37, the inner end of the latter being flush with the pipe 30. Pipe 38 is also of seamless brass tubing 0.065 inch in wall thickness, 68⅜ inches long, and one and one-half inches in outer diameter. An annular brass plug 39, which is two and five-sixteenths inches in outer diameter, one and one-half inches in inner diameter, and one-quarter inch thick, is fitted into the inner end of the water jacket assemblage 28, and brazed with silver solder in the peripheral junctions. The three concentric pipes 30, 37, and 38, constituting the water jacket 28, which are held in position by conventional separators, are fitted at their external ends into the terminal fitting or burner breech assembly 32, which is a cylindrical brass element five and one-half inches in axial length and three and one-half inches in diameter, having four openings, each communicating with a different concentric channel. The water intake pipe 35, which is about one inch in outer diameter, is tapped into a cylindrical arm which protrudes laterally about three-quarters of an inch from the burner breech assembly 32. The cylindrical arm is one and one-half inches in outer diameter and one inch in inner diameter, and leads at its inner end to the annular chamber between the brass pipes 37 and 38 of the water jacket 28. An oppositely directed lateral arm on burner breech assembly 32, which is similarily dimensioned, screws onto the water outlet pipe 36 and taps into the annular space between pipes 30 and 37, so that a stream of water entering at 35 flows the length of the water jacket 28 through the inner annular passage, and returns through the outer annular passage to 36, where it flows out.

The burner proper, whose tip 31 is designed to be moved to different positions within the inner sleeve 38, and in the present illustration is disposed at a position about 12 inches from the inside or furnace end of the tuyere pipe 14*a*, is housed in brass tube 38. Fitted inside of brass tube 38 is a cylindrical block burner element 41. This is a copper cylinder one inch long and one and three-eighths inches in outer diameter. A bore 41*a*, which is nine-sixteenths inch in diameter, extends through the length of the element in an axial position. Extending parallel to and surrounding the bore 41*a* are a plurality of smaller bores 41*b* which are 16 in number and one-eighth inch in diameter in the present embodiment and serve to transmit streams of oxygen. These are symmetrically disposed with their centers on a circle one and one-sixteenth of an inch in diameter and concentric with bore 41*a*.

Terminating in and fitted into the bore 41*a* of block burner element 41, and silver brazed in place, is a stainless steel tube 42, three-fourths of an inch in outer diameter, one-sixteenth of an inch in wall thickness, and 79¾ inches long, which serves as a conduit for fuel oil. At the inner terminal in the block burner element 41, the stainless steel tube 42 is screw threaded to a depth of about three-eighths of an inch, designed to receive a matching screw-in fitting on the burner orifice element 43, which is a brass cylindrical element one-half inch deep and about three-quarters of an inch in diameter. The central opening 43*a*, 43*b* of orifice element 43 is axially disposed, having a larger cylindrical portion 43*a* about one-quarter inch in inner diameter, which communicates with the conduit 42, and extends axially to about one-eighth inch from the end toward the furnace, where it abruptly narrows to a much smaller opening 43*b*, about one-sixteenth inch in diameter in the present embodiment.

The stainless steel conduit 42 extends axially through the burner breech assembly 32 and terminates at its outer end in a brass bushing 33*a* which is three-quarters inch in outer diameter and one-half inch in inner diameter and internally screw threaded for coupling to the oil feed line 33.

A lateral inlet arm 34*a*, which is one and one-half inches in outer diameter and one inch in inner diameter, leads out of the burner body assembly 32 and is coupled in a gas-tight seal with the oxygen hose 34, for introducing oxygen into the annular space between the stainless steel oil conduit 42 and the inner brass tube 38.

Figure 4:
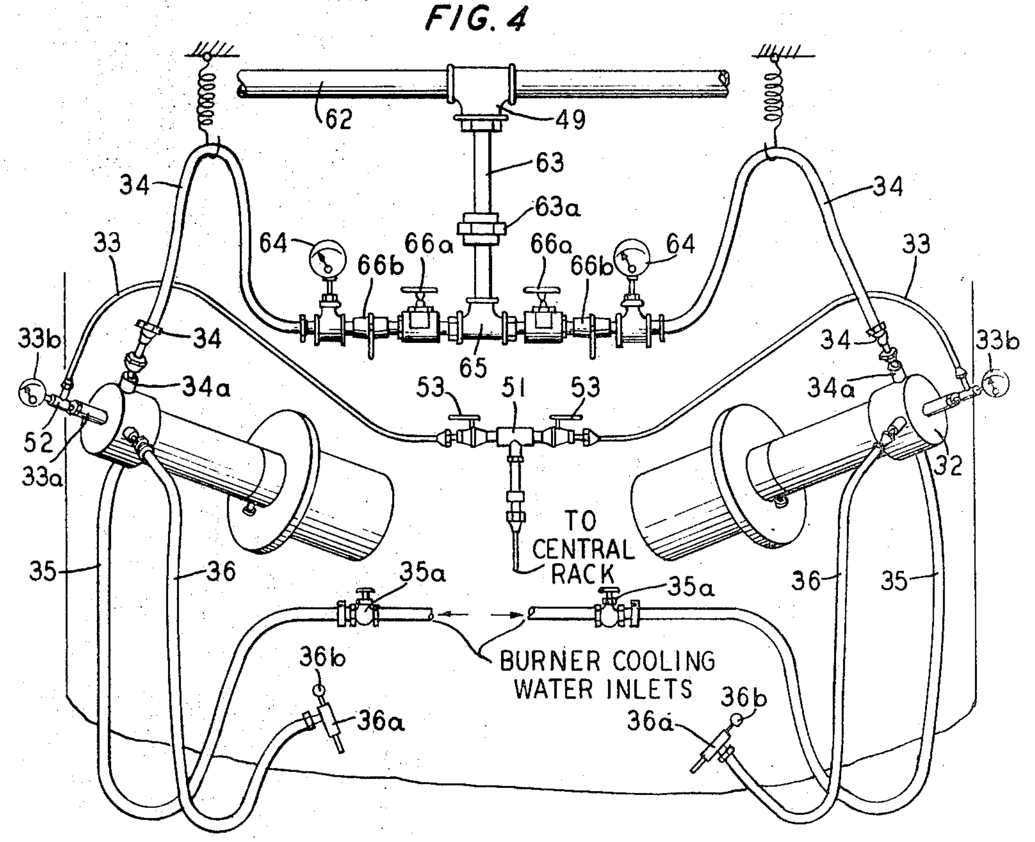
FIG. 4 shows, in enlarged perspective, details of the oxy-fuel and water supply lines in the system of FIG. 1.

Referring to FIG. 4, there is shown in perspective an example of the configuration of the oxygen, fuel, and cooling water pipes connected between a typical pair of tuyere burners and the respective supply systems for oxygen, fuel, and cooling water in accordance with the present invention.

In preferred arrangement, water for cooling the tuyere burner system is brought into the burner breech assembly 32 at a pressure of 50 pounds per square inch absolute, flow rate of 10 to 15 gallons per minute, and ambient temperature, from any ordinary water tap under control of the three-quarter inch globe valve 35*a*, passing through a three-quarter inch inner diameter flexible hose 35 of neoprene rubber or the like. The water passes through the concentric channels in the water jacket 28 of burner 10 and passes out through the three-quarter inch inner-diameter outlet pipe 36 to the outlet 36*a*, from which it drains away. A bimetallic thermometer 36*b* measures the temperature of the emerging water as one check on the temperature generated in the tuyere burners.

Oxygen for the tuyere burners is derived from the two inch inner diameter oxygen manifold 62 of steel pipe. Manifold 62 is connected into each of the T connections 49 through the respective branch line 63, of one and one-half inches inner diameter, to a second T connection 65, where it separates out into two equal branches, each of which is under control of a pair of valves in series, the nearest to the T being a one inch inner diameter Airco station valve 66*a*, and the second, a three-quarters inch inner diameter ball valve 66*b*. Following the valves 66*a*, 66*b* is a conventional pressure gauge 64, which is scaled to read branch line pressures within the range zero to 100 pounds per square inch. Leading out from each of the latter is a three-quarters inch inner diameter hose 34 formed of neoprene, one-quarter inch thick and 80 inches long in the present embodiment. The latter is coupled in gas-tight connection to the orifice coupling element 34*a* of the burner breech assembly 32 through a three-quarters inch inner diameter connecting union. In each case, the length of the oxygen hose 34 and of water hoses 35 and 36 is sufficient to permit the removal of the burner 10 from the tuyere pipe 14*a* without altering the connections or disconnecting the pipe systems.

Oil is piped to each of the burner locations from a distribution system including control rack 80 which will be presently described in detail with reference to FIG. 5. Four branches 81*a*, 81*b*, 81*c*, and 81*d*, each of copper tubing three-eighths inch in outer diameter and 0.035 inch wall thickness, lead out in parallel from the control rack 80 to a respective one of the three-eighths inch inner diameter T junctions 51, each of which services a pair of tuyere burners, with the exception of the tuyere adjacent the spout 19 which services only one. Just ahead of the respective T junctions 51, the three-eighths inch inner diameter copper branches 81a, 81b, 81c, and 81d, respectively pass through couplings which are fitted into steel pipes in which the inner diameters are reduced to one-quarter inch, and which are welded to supporting brackets, not shown.

From the T junctions 51, two equal branches 33, each of annealed copper tubing three-eighths inch in outer diameter, are oppositely directed, the flow in each branch under control of a three-eighths inch inner diameter ball valve 53 (see FIG. 4). In the present illustrative embodiment, the copper tubes 33 are each 60 inches long and are looped to allow the burners to be removed from the tuyeres or to be operated in various withdrawal positions. Each of copper tubes 33 at its end feeds into a second T junction 52 (see FIG. 4) in which the internal diameter is reduced to one-quarter inch. At each of the T junctions 52 is located a small pressure gauge 33b, designed to accommodate a range from zero to 50 pounds per square inch. The opposite arm of each of T junctions 52 is connected through a coupling 33a to the burner breech assembly 32.

Figure 5:
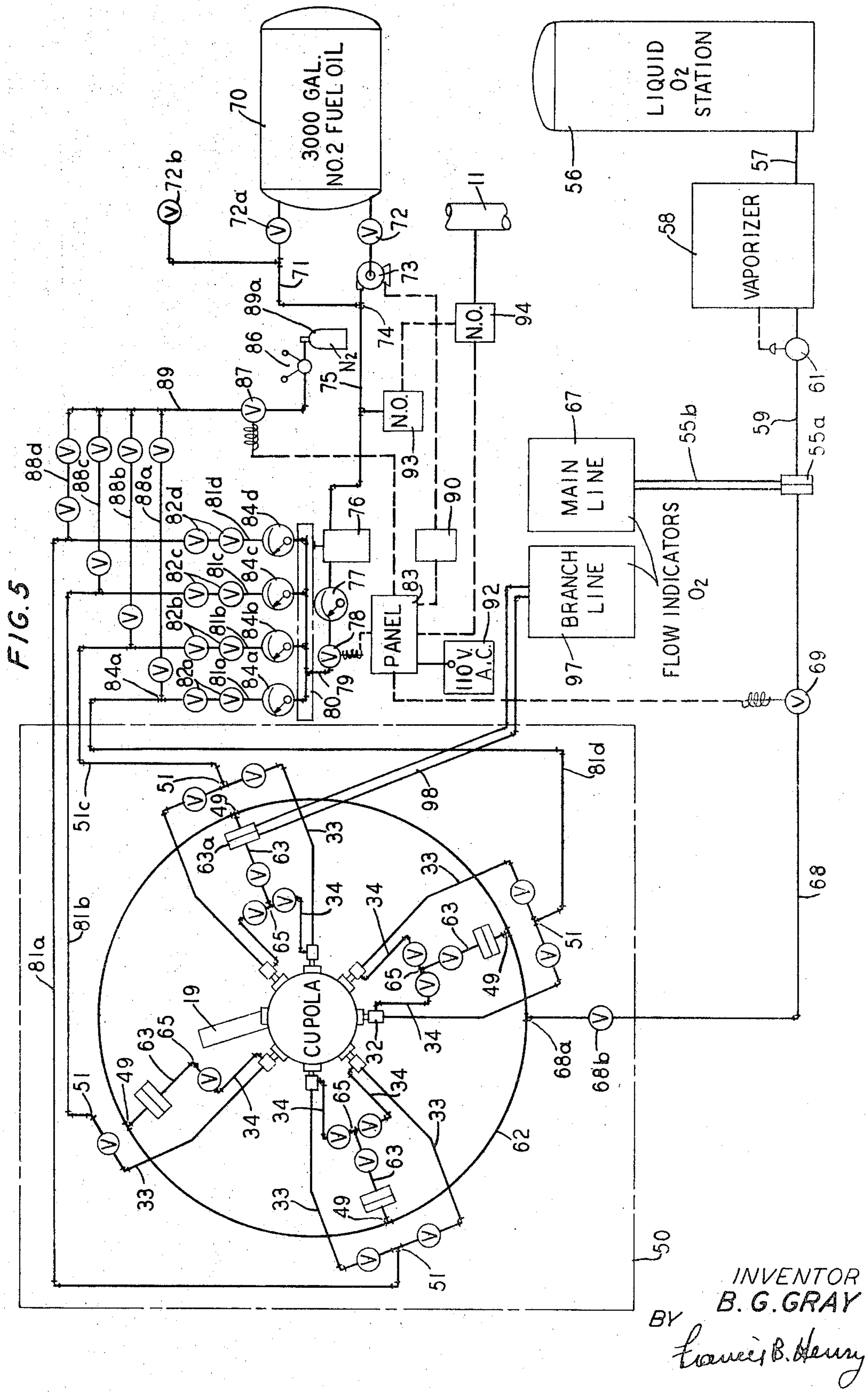
FIG. 5 shows an oxygen-oil supply system for the oxy-oil tuyere burner system of FIGS. 3A, 3B.

FIG. 5 of the drawings shows schematically the entire oxy-fuel oil system, of which the pipe system was described with reference to the perspective showing of FIG. 4.

A conventional 3000 gallon tank 70 provides oil storage for a maximum fuel consumption of 300 gallons per hour for eight hours at ambient temperature and pressure. Tank 70 is connected to the inlet side of a conventional five horsepower centrifugal pump 73 under control of the valve 72. The motor for driving pump 73 is preferably a 220 or 440 volt three-phase type. The outlet side of pump 73 is connected through a one and one-half inch inner diameter copper pipe to one leg of a T junction 74, a second leg of which is connected through a one inch inner diameter bypass line 71 under control or normally closed valve 72a, returning to the tank 70, or alternatively, to an outlet valve 72b which is normally closed. The third leg of T 74 is connected to a one inch inner diameter steel pipe which passes under control of solenoid-actuated valve 78 to a fuel oil control rack 80 through a pressure regulator 76 and a positive displacement flowmeter 77. Solenoid actuated valve 78 may be of a manual reset type, such as part No. 802251, described in Bulletins of the Automatic Switch Company of Florham Park, N.J., and referred to on page 52 of their catalog No. 203. The pressure regulator 76 may be of a conventional type. Flowmeter 77 is also of any type well-known in the art. In the present example, means is also provided for filtering the oil flow entering rack 80. The flow entering rack 80 is regulated to a pressure of 90 pounds per square inch absolute and a flow rate of 180 to 300 gallons per hour at ambient temperature. The control rack 80 comprises a manifold steel pipe, one inch in inner diameter, from which the oil is fed out through a plurality of substantially identical pipes of soft copper tubing, each three-eighths inch in inner diameter.

The four branches employed for oil distribution to the tuyere-burner system of cupola 1 are 81a, 81b, 81c, and 81d, the flow in each branch being controlled by a respective one of the dual valves 82a, 82b, 82c, and 82d, which preferably include conventional needle valves. The positive displacement meters 84a, 84b, 84c, and 84d in the individual branches respectively measure the flow in each branch.

An additional conduit 89 is connected under control of the solenoid operated valve 87, which may be of the type previously described, and the manual valve 86 to a storage tank 89a of nitrogen, for purging the oil from the burner oil delivery system through a series of branch lines 88a, 88b, 88c, and 88d, which are respectively connected to branch oil lines 81a, 81b, 81c, and 81d, of the fuel oil control rack 80 under control of individual cut-off valves in each line. The latter branches respectively lead into the T junctions 51, which separate into the branches leading to pairs of individual burners 10, as previously described with reference to the perspective showing of the oil delivery system of FIG. 4.

The electrical control panel 83, which is powered by the 110 volt alternating current source 92, provides push button electrical control for the manual-reset solenoid operated valve 78 at the inlet to fuel rack 80, and relays and timers for controlling the solenoid operated valve 87 to the nitrogen purge system. Control 83 provides power to energize the normally operated relays 93 and 94, which react to changes in pressure in the wind box 11 or failure in the oil pressure to cut-off the oil supply to the fuel rack 80. The foregoing relationship is indicated schematically in FIG. 5. The fuel rack 80 in one embodiment embraced electrical control panel 83, and was devised for experimental purposes enabling individual control and purge of each bruner. Subsequently, an improvement and simplification of controls has been devised using commercially available ratio controllers such as shown, for example, on page 43 of Catalogue No. 2, Publication 13,-316, printed July 1959 by Fischer and Porter Company of Warminster, Pa. Additionally, a purge system is used in conjunction with the ratio controller to bleed nitrogen or steam into the oil lines, using commercially available valves and timers.

Oxygen for the burners 10 is furnished from a liquid oxygen station 56. In the present illustration this is a stainless steel vessel of the type shown, for example, on page 11 of Catalogue No. 450, issued November 1960, by Air Reduction Company, Incorporated, 150 East 42nd Street, New York, N.Y. The liquid oxygen in station 56 is maintained at a temperature of −240 degrees Fahrenheit, under a pressure of 165 pounds per square inch absolute.

In the present example, a copper tube 57 having an outer diameter of 2⅛ inches and .083 inch in wall thickness, connects station 56 to a vaporizer 58. The latter is a conventional electrically energized unit capable of converting liquid oxygen at a temperature of −240 degrees Fahrenheit and pressure of 165 pounds per square inch absolute, at the rate of 40,000 standard cubic feet per hour to vapor at 40 degrees Fahrenheit at the same pressure. The newly generated vapor passes through a pressure regulator 61, where its pressure is regulated to a pressure of approximately 145 pounds per square inch absolute. Regulator 61 may be a conventional type of pressure-reducing regulator capable of operating in the range of 315 pounds per square inch absolute inlet pressure to 165 pounds per square inch absolute outlet pressure. This regulator preferably handles a volume of 40,-000 standard cubic feet per hour, minimum, at the foregoing pressures.

Regulator 61 is connected at its output to a steel conduit 59 which is two inches in inner diameter and .218 inch in wall thickness, into which is interposed an orifice flange 55a from which a conduit system 55b comprising a three-eighths inch outer diameter copper tube .035 inch in wall thickness leads off to the main line flowmeter 67 under control of an appropriate system of valves.

The conduit 59 is connected to a similar conduit 68 through solenoid operated valve 69, which is remotely energized from the control panel 83. Valve 69 is also connected to be actuated through control panel 83 to relays 93 and 94 which are responsive to changes in the pressure in the wind box or failure in the oil pressure, to cut-off the flow of oil to the oil rack 80, followed by cut-off of oxygen in conduit 68 about two minutes later.

The steel conduit 68, which is two and three-eighths inches in outer diameter and .218 inch in wall thickness, leads from the valve 69, normally open during operation of the stystem, to the T junction 68a which leads into the oxygen manifold 62, under control of a 2 inch ball valve 68*b*. The manifold 62 is a pipe formed of steel, two and three-eighths inches in outer diameter and .218 inch in wall thickness, which forms a horseshoe, partly surrounding and adjacent to the wind box 11 of the cupola 1, having an outer diameter of 16 feet, and an inner diameter of 15½ feet. Oxygen manifold 62 has four outlets 49 at symmetrically spaced positions on its inner perimeter, which are located adjacent the corresponding T junctions 51 which lead out from the oil rack 80. As previously described with reference to the perspective showing of FIG. 3, the T junctions 49 each supply oxygen to the tuyere burners 10 through four branch lines 63, which are each divided into two branch lines 34, with the exception of the junction nearest the spout 19, which services only one branch line.

The four oxygen branch lines 63 are each equipped with orifice flanges **63*a* into which a branch line flowmeter 97, similar in form, but of smaller capacity than the previously described main line flowmeter 67, can be plugged into the branch line through the conduit system 98**.

In accordance with prior art practice, a cupola of the type shown in FIG. 1, without tuyere burners arranged in accordance with the teachings of the present invention, conventionally operated in the following manner to produce molten iron.

The 5,000 pound metal charge, which was introduced into the furnace through the charging door 18 by means of a bottom-drop bucket, contained approximately 20 percent steel scrap, the balance being iron scrap. An identical bucket was used to introduce coke and fluxes, such as limestone, into the furnace between the metal charges. The coke rate was normally 240 pounds per ton of metal charge, corresponding to a metal-to-coke ratio of 8.35:1.

Full production in this furnace required an air blast of 8,000 standard cubic feet per minute into the eight tuyeres and consumed between six and eight charges per hour. A blast of air, accelerated by the blower 13 and heated up to 1,200 degrees Fahrenheit in the stove **13*a*, was circulated in the wind box 11 from which it was delivered to the interior of the furnace through the tuyeres 14** at a volume flow rate of between 4,000 and 10,000 standard cubic feet per minute. Metal was tapped continuously to a tilting fore-hearth for distribution to transfer ladles which supplied metal to centrifugal pipe casting machines and to a conveyor line for the casting of pipe fittings. The neutral-to-slightly-basic slag was broken up by a water stream and removed by a bucket conveyor. Charge chemistry was maintained during the operation to allow production of iron at the spout containing approximately 3.70 percent carbon and 2.10 percent silicon, according to half-hourly measurements. The metal temperature at the spout was usually maintained in excess of 2,900 degrees Fahrenheit, during operation.

In accordance with the present invention the auxiliary oxy-oil burner system 10, described with reference to FIGS. 1 through 5, is operated in the following manner, in conjunction with cupola operation substantially as described in the foregoing paragraphs.

Buttons are initially pushed on panel 83 to close the solenoid operated valve 78 to the oil line 75 and the solenoid operated valve 69 to the oxygen line 59, and to open the normally-closed solenoid operated valve 87 to the nitrogen (or steam) purge system, thereby admitting nitrogen (or steam) from the nitrogen source 89 (or alternate steam source) to the system of branch purge conduits **88*a*, 88*b*, 88*c*, and 88*d* connected to respective oil conduits 81*a*, 81*b*, 81*c*, and 81*d*. For the purposes of the present purging operation, nitrogen is fed into each of the aforesaid branch lines of oil rack, 80 at a volume flow rate of 20 standard cubic feet per minute, at a pressure of 75 pounds per square inch absolute, at ambient temperature. This flow is continued for a period of 3 minutes until each of the oil lines is purged of fuel and gases remaining from a previous operation. After this purge operation has been completed, valve 87 is closed and the system is made ready for operation of the burners. Referring to FIG. 4, the water, which is constantly flowing in the burner cooling system, passes through the intake hose 35, under control of valve 35*a*, entering the burner jacket through the burner body head assembly 32 at a pressure of about 50 pounds per square inch absolute, at ambient temperature, and a volume flow rate of 10 to 15 gallons per minute. The water in each of the burner jackets flows out through the return hose 36 and vent pipe 36*a*, the temperature being measured by the thermometer 36*b***.

The centrifugal blower 13 is operated to force a blast of air through pipe 12 to the wind box 11 where it enters at a pressure of 15.0 to 16.2 pounds per square inch absolute, a temperature of 1,200 degrees Fahrenheit, and circulates in the wind box at a volume flow rate of 8,000 cubic feet per minute, or a velocity of 5,700 feet per minute.

Prior to the lighting of the burners 10, the wind is spilled through a vent pipe (not shown) in the wind box 11 and is not released into the tuyeres 14.

The technique for lighting the burners is to first turn on the fuel supply alone, without the oxygen. Thus, oil valve 78 is reopened to permit oil to flow through the oil rack 80 at an initial rate of 20 gallons per hour, at a pressure of 17 pounds per square inch absolute, at ambient temperature. The flow passes into each of the branches **81*a*, 81*b*, 81*c*, and 81*d*, which transmit the separate streams of oil under control of the branch line valves 84*a*, 84*b*, 84*c*, and 84*d*, through the T junctions 51 and the individual lines 33 to the fittings 33*a* in the burner body head assembly 32 in each of the tuyere-burners 10**. Assuming the furnace is in operation, the oil is immediately ignited by the heat of the furnace. Otherwise, conventional auxiliary means of lighting are employed, such as an electrical igniter, or an oxy-acetylene torch, which would be interposed into the tuyere through a separate opening (not shown).

For optimum operation in the embodiment under description, the end of each of the burners 10 may be withdrawn from the inner end of the tuyere **14*a* a distance of 2 feet. In fact, to provide a greater length of the burner barrel in which combustion may take place, the burner may be withdrawn to the limit of the water cooling in the tuyere, which in the present embodiment would be at the cross-sectional plane of the butt junction between the outer end of tuyere pipe 14*b* and extension pipe 24. Moreover, the burners 10 are concentrically disposed in the tuyeres 14 by means of the spider arrangement 29. After the burners have been lighted, the rate of oil flow is increased so that, in the present example, each separate oil stream enters the burner body head assembly 32** at a volume flow rate of 25 to 30 gallons per hour, a pressure of 35 to 65 pounds per square inch absolute, and ambient temperature.

Immediately after the oil is lighted, a stream of oxygen is caused to flow into the conduit 68 at a volume flow rate of 500 to 600 standard cubic feet per minute. The stream flow through the T junction **68*a* into the oxygen main 62, from which it is delivered through the auxiliary branches 63 and the individual lines 34 to the burner breech assembly 32. In the present illustration, the oxygen flows into each of the latter at a volume flow rate of one-seventh of the flow rate through the conduit 68**, at a pressure of 45 to 65 pounds per square inch absolute, and ambient temperature.

Assuming the parameters given, in oxy-burner flame is produced in the burners which extends approximately 36 inches from the burner tip 31, and which is characterized by a flame velocity of about 800 feet per second and a flame temperature of between 4,000 and 5,000 degrees Fahrenheit. Once the high velocity flame is seated in the burner, the blast from wind box 11 is restored to the tuyeres 14 at a volume flow rate of between 8,000 and 9,000 standard cubic feet per minute, or a wind velocity in each of the individual tuyeres of 5,700 feet per minute.

During continuous operation for a week, in the example under description, with reference to FIGS. 1–5, the self-atomizing tip mix burners 10, of the form shown in FIGS. 3A, 3B, used in aggregate an average of 189 gallons per hour of oil and 39,550 standard cubic feet per hour of oxygen, or 210 standard cubic feet of oxygen to a gallon of oil. This amounts to 75 percent of the oxygen stoichiometrically required for complete combustion of the fuel oil. Oxygen preferred for the purposes of the present invention is a commercial grade, 99.5 percent pure, which is manufactured by the Air Reduction Company, Inc. to the following specifications:

TYPICAL ANALYSIS IMPURITY CONTENT

Argon: 0.15–0.3 percent (by volume)
Carbon dioxide: 0.0005 percent (by volume)
Hydrocarbon ($C_2H_2$): 0.00002 percent (by volume)
Nitrogen: 0.1–0.25 percent (by volume)
Maximum Due Point: 80 degrees Fahrenheit
Water Vapor: 7.8 parts per million An oil suitable for the purposes of the present invention is identified as No. 2 industrial fuel oil, according to the standard of the American Society for Testing Materials. Another oil suitable for the purposes of the present invention is identified as No. 6 heavy industrial fuel oil (Federal Specification Board, Bunker Oil "C") identified in the United States Bureau of Standards Commerecial Standard CS 12–29.

Table I which follows gives analysis of the principal components of No. 2 fuel oil and "Bunker C", derived from page 66, Babcox & Wilcox, Useful Tables, 8th Edition, 1963:

TABLE I.—OIL ANALYSIS
[Percentages by weight]

| | No. 2 | Bunker C |
|---|---|---|
| Sulphur | 0.01–0.5 | 0.7–3.5 |
| Hydrogen | 11.8–13.9 | 9.5–12.0 |
| Carbon | 85.9–86.7 | 86.5–90.2 |
| Ash | Nil | 0.01–0.50 |
| Heating value (British Thermal Units), per lb | 19,170–19,750 | 17,410–18,990 |

Atlernative types of the oxy-oil self-atomizing tip mix burners 10 disclosed and described in detail with reference to FIGS. 3A, 3B of the drawings, which may also be used successfully in the tuyeres 14 in accordance with the present invention, are rocket burners 100 of the design shown in detail in longitudinal section in FIG. 6A, and in cross section in FIG. 6B. These include the same water jacket 28 as shown with reference to the burners of FIGS. 3A, 3B, including concentric tubes 30, 37 and 38, only the internal burner portions being modified as shown in accordance with the burner insert indicated in FIGS. 6A, 6B.

Referring to the latter figures, there is shown an axially disposed fuel gas tube 138 of stainless steel, which is three-quarters inch in outer diameter, 0.035 inch in wall thickness, and 60 $^{21}/_{32}$ inches long, which terminates at its outer end in a male connector 133*a*, for connection to the branch gas line 133 in the gas supply system to be described presently. At the inner end, tube 138 is fitted into and fastened with silver braze in the cup-shaped opening of a cylindrical brass adapter 139, which is three-quarters inch in inner diameter, one inch in outer diameter, and one inch in axial length. The adapter 139, which terminates two and one-half inches from the terminal end of the burner block 141, accommodates a bundle of five stainless steel tubes 140, each one-quarter inch in outer diameter, 0.020 inch in wall thickness, and six and one-quarter inches long, which are nearly parallel to the principal axis of the burner and disposed in symmetrical array about the burner axis. The terminal ends of tubes 140 pass through the burner block 141, so that the centers of their orifices in a cross sectional plane lie in a circle $^{41}/_{64}$ of an inch in diameter. The burner block 141, which replaces burner block 41 of burner 10, is a copper cylinder 1⅜ inches in outer diameter, which is slidably fitted inside of the inner pipe 38 of the water jacket 28 of FIGS. 3A, 3B. In addition to fuel gas tubes 140, burner block 141 includes a plurality of parallel bores for oxygen vents 142*a* and 142*b*, each one-eighth inch in diameter, which are symmetrically arranged with their centers in two concentric circles, the outer one comprising vents 142*a* being 1⅛ inch in diameter, and the inner one comprising vents 142*b*, being $^{7}/_{64}$ inch in diameter.

As in burner 10 previously described, oxygen flows through coupling 134*a* into burner body head 32. The annular space between the inner water jacket pipe 38 and the gas tube 138 serves to conduct oxygen to the burner block 141 where it passes through orifices 142*a* and 142*b*. Gas passes in through the connector 133*a* and pipe 138 to adapter 139, where it is fed into the five gas tubes 140 in the burner block.

Figure 7:
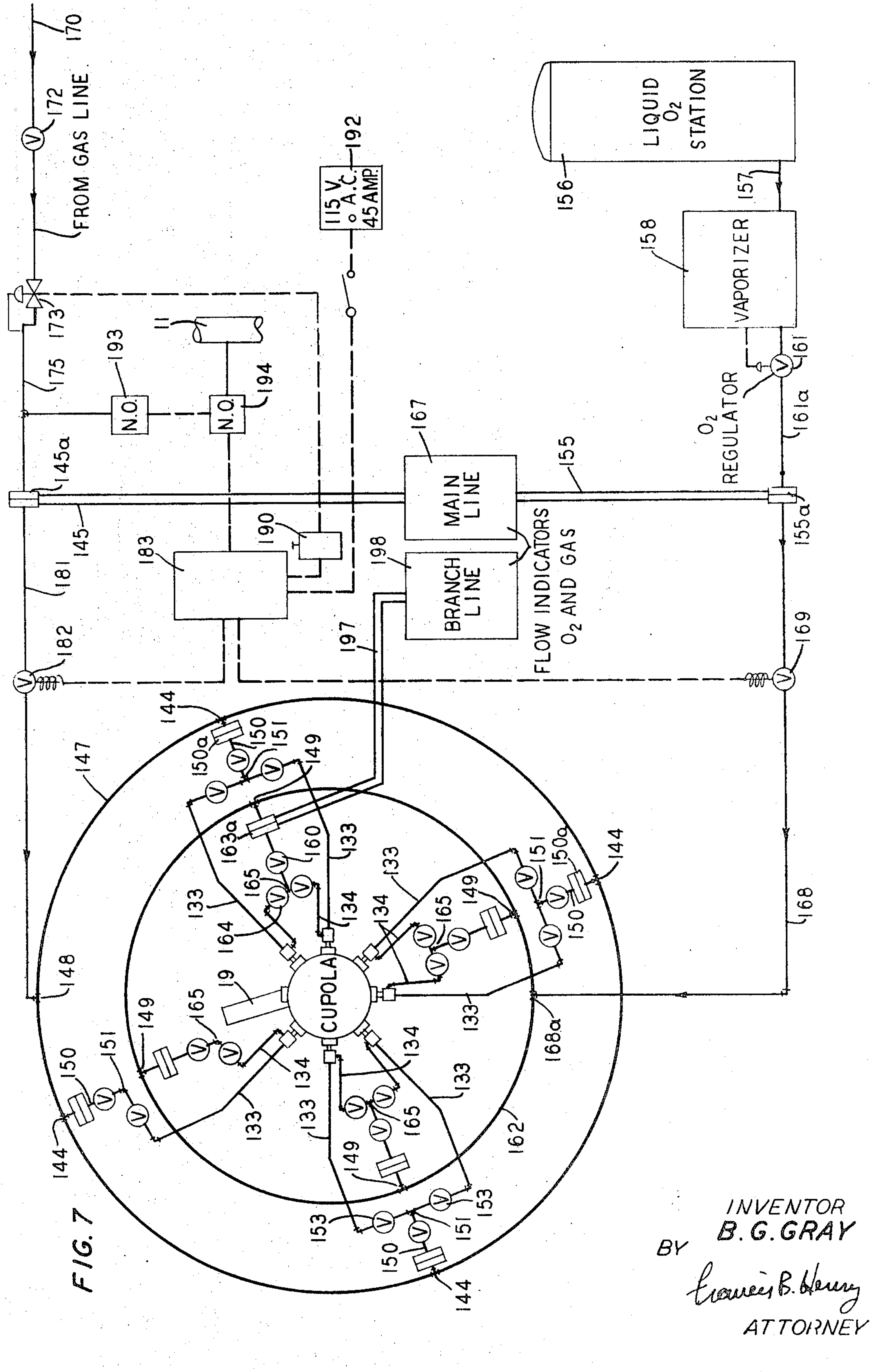
FIG. 7 shows an oxygen-gas supply system for use with a burner employing an insert of the type shown in FIG. 6A, 6B.

Referring again to FIG. 4 of the drawings which shows in perspective the connecting hoses between the fuel supply system and the burners in the tuyeres 14, the arrangement for employing the rocket burners 100 in place of the self-atomizing tip mix burners 10, described in the earlier part of the specification, is substantially similar except that for the purposes of the embodiment to be presently described, a gas supply system such as shown in FIG. 7 will replace the oil supply system previously described with reference to FIG. 5.

It will be apparent that in both the systems disclosed in FIG. 5 and FIG. 7, the oxygen supply system is substantially similar, the latter being designated with numbers which have the same tens and digit termination to avoid a duplication of description. Thus, in the system of FIG. 5 the elements of the oxygen supply system are designated by numerals ranging from 49 through 69; and, in the supply system of FIG. 7, the elements of the oxygen supply system are designated by numerals 149 through 169.

Referring now to the gas supply system shown in FIG. 7 of the drawings, the natural gas is derived from a conventional gas pipe line 170 under control of a conventional ball-type valve 172, the outlet of which is connected to the inlet of a conventional gas pressure regulator 173.

The outlet of the pressure regulator 173 passes through a steel pipe 175, which is 2⅜ inches in outer diameter and .218 inch in wall thickness, to an orifice flange 145*a* which serves for the connection through conduit 145, comprising a pair of three-eighths inch outer diameter flexible copper lines, to the flowmeter 167. The latter may be of any conventional type capable of measuring up to 20,000 standard cubic feet per hour natural gas at an inlet pressure of 65 pounds per square inch absolute.

The gas line 181 passes through the manual reset solenoid-operated valve 182 which is energized through the electrical control panel 183, by the 115 volts, 10 amperes alternating current source 192. Valve 182 may be of any of the types well-known in the art.

From the valve 182 the gas line 181 passes into a T connection 148 which leads to the gas manifold 147. The latter which is a pipe formed of steel, 0.218 inch in wall thickness, has an outer cross sectional diameter of 2⅜ inches, and surrounds the cupola in a plane above the wind box 11 of FIG. 1, forming a circle having an outer diameter of 192 inches and an inner diameter of 187 inches. The gas main 147 has four symmetrically spaced outlets 144, each of which leads into a branch line 150. On each of the lines 150 is an orifice flange 150*a* to which may be connected a branch line flowmeter of a type similar to the main line flowmeter 167 except that its capacity is more limited, and the reading more accurate. Each of the branch lines 150 leads into a T junction 151, each of the arms of which separate into a pair of branches 133, except for the one nearest the cupola spout 19 which has only a single branch. T junctions 151 are formed of steel pipe, and have inner diameters of one inch. The connecting branches 133 are each of ¾ inch inner diameter flexible rubber hose, 108 inches long, and are controlled at the T junction 151 by a pair of ball valves 153. The branch pipes 133 are made long enough and flexible enough to permit the position of burners 100 to be adjusted in the tuyeres 114 (see FIG. 1) or removed altogether without rupturing the hose. Each of the branches 133 is tapped into the fitting 133*a* on burners 100, leading to the gas pipes 140 therein (see FIG. 6B). Each of the individual lines 133 has a meter for measuring pressure and flow rate into the burner 100.

Whereas in preferred form for use in the cupola, oxy-gas burners may assume the form of the rocket burner insert indicated in FIGS. 6A and 6B, just described; alternatively, oxy-gas burners may be of the form shown in FIGS. 8A, 8B, 8C which is a variant type of rocket burner designed for use with either gas or oil, or both, as fuel, using oxygen as a combustant.

Referring to FIGS. 8A, 8B, 8C, the burners 200 are designed to be placed in the tuyeres 14 in substantially the same manner as burners 10, as indicated in FIG. 2 of the drawings. Each of burners 200 is 44½ inches long and equipped with a water jacket. The latter comprises an outer brass tube 202 which is four and one-half inches in outer diameter, 0.125 inch in wall thickness, and 24⅜ inches long; a second concentric brass tube 203, which is four inches in outer diameter, 0.065 inch in wall thickness, and 25⅝ inches long; and an inner concentric brass tube 204 which is three and one-half inches in outer diameter, 0.135 inch in wall thickness, and 28 inches long. The three concentric tubes 202, 203, and 204 forming the water jacket are mounted so that tubes 202 and 204 are flush at their inner ends, and tube 203 is recessed from the inner end by one-half inch. The ends of tubes 202 and 204 are spaced apart by an annular brass ring plug which is four and one-quarter inches in outer diameter and three and one-half inches in inner diameter and one-quarter inch in axial extent and is fastened into place with a silver solder braze.

The three concentric tubes 202, 203, and 204 terminate at their outer ends away from the furnace in a burner breech assembly 205. This is a brass cylindrical fitting seven and one-half inches long, and five and one-half inches in outer diameter, which at its inner end has a collar fitting over the end of the brass tube 203, overlapping it for one-quarter inch, the two surfaces being brazed together by means of a one-sixteenth inch silver solder wire. Axially disposed in tubes 202, 203, and 204 is an additional tube 206, which is formed of type 304 stainless steel three-quarters inch in outer diameter, 0.035 inch in wall thickness, and 39 inches long. The inner end of the center tube 206 terminates in a cylindrical brass block burner fitting 211 which is 3.23 inches in outer diameter at the peripheral end of the burner and two inches in axial extent, terminating at its end away from the orifice in a slight flange three-sixteenths inch deep, over which is fitted a stainless steel tube 212 three inches in outer diameter, 0.065 inch in wall thickness, and six inches long, which is held in position on the flange by means of a silver solder braze. The block burner fitting 211 has an axial opening, at its inner or burner end, three-quarters inch deep which accommodates the terminal end of the central tube 206, centered on a connecting opening 207 which is one-half inch in inner diameter and one-half inch long. The connecting opening 207 flares slightly three-eights inch from its burner end, terminating in a female screw fitting 207*a* five-eighths inch deep and three-quarters inch in diameter, into which may be fitted any one of a plurality of orifice male fittings 208, the size of whose orifice depends on the type of fuel contemplated for use.

In the present embodiment the orifice fitting 208 is a brass screw-in fitting, at the connecting end of which, away from the orifice, there is a cylindrical opening 208*a* one-half inch in diameter extending one-quarter inch toward the end. The diameter of the opening then sharply narrows to a centered mouth 208*b* one-quarter inch in diameter. Adjacent the mouth 208*b*, are a pair of blind holes 209, one-eighth inch deep and one-eighth inch across, at diametrically opposite positions for screwing the orifice fitting 208 in place. Surrounding the center pipe 206 and located with their centers on a circle one inch in diameter are eight symmetrically spaced tubes 210. Each of the latter is of stainless steel one-half inch in outer diameter, 0.02 inch in wall thickness and eight inches long, terminating in the block burner fitting 211 with the ends flush with the end of the orifice 208*b*.

Looking at the cross-sectional view of FIG. 8C, it is apparent that between the central orifice 208*b* and the circle of larger openings 210, are concentrically arranged eight smaller one-quarter inch diameter openings 213, the centers of which lie on a circle one and one-eighth inches in diameter, and which are symmetrically spaced and midway between each of the adjacent openings 210. On an outer concentric circle two and three-eighths inches in diameter, are an additional series of symmetrically disposed openings 214, also eight in number, which are each five-sixteenths inch in diameter. The central orifice 208*b* and the connecting central pipe 206 may serve for the transmission of fuel oil in the burner, whereas the surrounding openings 210 may serve for the transmission of fuel gas, the interspersed smaller openings 213 and 214 serving for the transmission of oxygen.

Between seven and one-half inches from the inner end of burner orifice 208*b* is an adapter tube 215, one-half inch in axial extent, which serves to hold the bundle of tubes 210 in position within the enclosing concentric tubes 202, 203, and 204, and which also retains the center tube 206 in its axial position. The adapter 215 is also flanged to accommodate a stainless steel tube 216 which is one-half inch in outer diameter, 0.065 inch thick, and 27 inches long, and which fits concentrically around tube 206.

The burner breech assembly 205 is machined of brass to accommodate the center tube 206 and the surrounding concentric tube 216, in addition to the outer tubes 202, 203, and 204. The burner breech assembly 205 includes a pair of oppositely directed lateral brass bushings 217 and 218, each having an outer diameter of one and three-quarters inches and protruding outwardly three-quarters inch from the edge of the fitting 205. The connecting pipe to bushing 218 is tapped into the annular spacing between tubes 203 and 204, serving as a water inlet; whereas the connecting pipe to bushing 217 is tapped into the annular spacing between the tubes 202 and 203, serving as a water outlet.

An additional brass bushing 219, which is two and one-half inches in outer diameter and one and three-quarters inches in inner diameter, serves as a connecting inlet for fuel gas into the annular space between the tubes 204 and 216. The inner tube 206 and the concentrically enclosing tube 216 are extended through a conventional connecting element 226 to arm 227 of a T fitting 220 having a lateral inlet 223 two and one-half inches in outer diameter, two inches in inner diameter, and protruding about three-quarters inch from the outer pipe periphery. The latter serves as an oxygen inlet to the annular spacing between the central pipe 206 and the concentric pipe 216. The central pipe 206 passes through arm 221 of the T connection 220 and terminates in a coupling 222 about three-quarters inch in inner diameter and one and one-half inches in outer diameter for feeding fuel oil into the center pipe 206.

Burners of the form shown in FIGS. 3A, 3B, modified according to FIGS. 6A, 6B, designated burners 100, were employed for performing the series of oxy-gas tuyere burner tests about to be described, instead of the self-atomizing tip-mix burners described with reference to FIGS. 3A, 3B which were employed in the oxy-oil tests previously described. However, it will be understood that the burners 200, just described, which are designed to be alternatively employed as oxy-gas or oxy-oil burners, or to burn a combination of oil and gas fuels, could alternatively be employed for this purpose, assuming the cupola tuyeres are properly dimensioned to accommodate the larger cross-sectional burners.

The oxygen used in the operation about to be described is of a commercial grade of purity meeting the specifications set forth in the previous description with reference to the operation of the oxy-oil burners of FIGS. 3A, 3B.

Gas to be used as fuel in the burners 100 is preferably natural gas, of which the following Table II shows an analysis of the principal components.

TABLE II.—NATURAL GAS

[Percentages by volume]

| | Source | | |
|---|---|---|---|
| | Pittsburgh | Kansas City | Los Angeles |
| Methane, $CH_4$ | 83.4 | 84.1 | 77.5 |
| Ethane, $C_2H_6$ | 15.8 | 6.7 | 16.0 |
| Carbon dioxide, $CO_2$ | | 0.80 | 6.5 |
| Nitrogen, $N_2$ | .80 | 8.4 | |
| Heating value, B.t.u./ft.$^3$ | 1,124 | 974 | 1,07 |

Furthermore, any of the following hydrocarbon oils or gases may be employed as fuels for the rocket burners of the present invention, such as, for example, methane $CH_4$, ethane $C_2H_6$, propylene $C_3H_6$, propane $C_3H_8$, or fuel oils Grades No. 1 to No. 6 as enumerated on page 66 of Babcock & Wilcox, Useful Tables, 8th edition, 1963, either singly or in various mixtures.

The general operation of the 90-inch cupola of FIG. 1 is substantially as previously described. During the lighting of the burners, the air blast, which has been heated to a temperature of 1,200 degrees Fahrenheit and is circulating in the wind box 11, as indicated in FIG. 1, is spilled out through a vent pipe (not shown) so that it does not pass through tuyeres 14.

To start up operation of the system, a button on a control panel 183 is depressed to open the solenoid controlled valve 182. This permits gas from connecting line 175 to flow into the line 181 and from there into the circular main 147, through the T junction 148 and through T junctions 144 and branches 150 into the individual branches 133. From each of the branches 133 a stream of gas flows into the connecting gas inlet 133*a* of each of the burners 100. During the initial stages, the gas flow rate into the individual burners is 800 standard cubic feet per hour, at a pressure of 10 pounds per square inch absolute, and ambient temperature.

As in the case of the self-atomizing tip mix burners, assuming the furnace to be operating, the burners would be immediately ignited as soon as gas flows into them. If the furnace were cold, auxiliary lighting means would be employed, of a type previously described. As soon as the flame is lighted in the burners 100, the oxygen is turned on by depressing a button on panel 183 and manually lifting the manual reset solenoid operated valve 169. A stream of oxygen then flows into main 162, and into burners 100 through a conduit system similar to that described with reference to FIG. 5 of the drawings, in the oxy-oil system.

In the present example, oxygen flow control and measurement was made at each of the burner branch lines 134, so that oxygen flow into the individual couplings 134*a* of the burners 100 was maintained at 70 to 150 standard cubic feet per minute, at ambient temperature, and a pressure of 40 to 65 pounds per square inch absolute.

As soon as the flames were properly lighted and seated in burners 100, the vent of the wind box 11 was closed, and the blast again directed through tuyeres 14 (see FIG. 1) at a rate of 4,000 to 8,000 standard cubic feet per minute.

As in the case of the oxy-oil system, pressure switches 193 and 194, which are normally operated, are designed to be actuated in the event of gas pressure loss or wind spillage to shut off the supply of gas and oxygen by closing manual reset valves 182 and 169.

During the initial tests to be described, the burners 100 were water cooled, using individual water jackets 28 in the manner previously described; and, only four of the seven burners 100 were used, these being symmetrically spaced in alternate tuyeres 14 around the cupola. The burners 100 were designed to be long enough to allow them to be inserted to within two inches of the coke bed in the cupola, the position of the burners 100 being slidably adjustable in the water jacket 28, the concentric and lateral position of each of the burners in tuyeres 14, being controlled by a support spider 29.

The original criterion used in testing the effectiveness of tuyere burners 100 was their effect in increasing the preheat of the blast. While this criterion was used to determine firing rates of tuyere burners, it was realized that it would not be entirely accurate. inasmuch as the tuyere burners introduce combustion products into the furnace which produce either an oxidizing or reducing effect on the product, depending on the oxy-fuel ratio selected. Moreover, it was also realized that the combustion of natural gas in the burners released large quantities of water vapor into the furnace which extracts considerable heat when striking the hot coke.

As a starting point, the gas fuel in the burners was regulated to provide 200 degrees Fahrenheit increments of air preheat, assuming 100 percent efficiency in combustion and heat transfer from the burners to the air blast in the tuyeres. Tuyere burner firing rates during the tests described were substantially matched to the wind rates, firing rates of the burners being left unchanged for minor variations in the wind rates. Air blast temperatures were measured with a thermocouple (not shown) inserted into the tuyere through a sight port in the cover 25 (see FIG. 2), with the burner fired in maximum withdrawn position, as previously specified, to determine the efficiency of the heat transfer.

FIG. 9 of the drawings is a plot showing the relationship between observed wind heating by an oxy-gas burner 100 in one of tuyeres 14 and calculated values, with the total wind rate directed into all of the eight tuyeres at an average of 5,000 standard cubic feet per minute. The abcissa shows wind temperature measured in degrees Fahrenheit times 100; while the ordinate shows natural gas flow per tuyere measured in standard cubic feet per hour times 100. The calculated values indicated by points X are derived by assuming 100 percent efficiency for the combustion of fuel and heat transfer, as described in the foregoing paragraph.

It will be seen from the figure that efficiencies of 33.4 to 49.6 percent in heating up blast air in the tuyeres were obtained with a two-to-one oxy-gas ratio, with the higher firing rates being more efficient. It is also apparent from the figure that the 1.5:1 oxy-gas volume ratio was less efficient than the 2:1 volume ratio at the higher firing rates. During these tests, the cooling water flow through the burner jackets 28 varied from 10 to 15 gallons per minute with a temperature pick-up of approximately 25 degrees Fahrenheit.

The independent variables under study during the tests described were charge composition, wind rate, burner firing rate, and gas-oxygen ratio. Dependent variables included melting rate, iron temperature, iron composition, iron chill depth, flue gas temperature, and burner cooling water losses. Melting rate was measured on the basis of the number of 5000-pound metal charges consumed by the cupola over an hour period. Iron temperature was measured by optical pyrometer readings taken every half hour. Samples for chemical analysis of carbon and silicon were taken from the forehearth every half hour. Slag was judged mainly by the appearance of water cooled granules. Flue gas samples were analyzed for carbon dioxide ($CO_2$), carbon monoxide (CO), and oxygen ($O_2$), using a standard Orsat apparatus. The flue-gas temperatures were measured with a thermocouple placed in the stack 2 at the level of the charging door 18 (see FIG. 1).

During the first of the oxy-gas cupola trials, four symmetrically disposed burners 100 were operated firing natural gas at rates up to 9,300 standard cubic feet per hour, using oxy-gas ratios ranging from 1.2:1 to 2.0:1. The burners 200 were operated with their muzzles a foot from the inner end of the tuyeres 14. Burners were lighted with the wind off, in the manner previously described, to insure seating of the flame.

Observation of the slag, chill depth, and metal chemistry indicated that improper operation of the burners, without adjustment of certain parameters in accordance with the present invention in the manner set forth hereinafter, could influence the furnace operation adversely by lowering metal temperatures, lowering the silicon and carbon content of the product, increasing the chill, and obtaining slag samples which indicated improper fluxing. It was discovered in accordance with the present invention that optimum results were obtained using an oxygen-to-fuel gas ratio of at least about 1.5:1, which is 75 percent of the stoichiometric oxygen required for complete combustion of the fuel gas. The cooling water flow through these burners, which varied from 10 to 15 gallons per minute, showed a temperature pick-up of approximately 25 degrees Fahrenheit.

In accordance with another alternative method of operation of the present invention, seven oxy-gas burners 100, instead of four as previously described, were disposed in seven of the eight tuyeres in the cupola of FIG. 1, the tuyere nearest the spout 19 not being used, as in the case of the oxy-oil burners, because of the high temperature in that location. The oxy-gas ratio was maintained at 1.5 to 1, but the burners 100 were operated in withdrawn position (23 inches from the coke bed).

Total firing rates of 19,120 standard cubic feet per hour of gas fuel burned were used for the aggregate operated burners. The volume of wind flow in the wind box 11 was reduced to 5,000 standard cubic feet per minute. to compensate for the increased production resulting from the burner.

The outstanding effect of the oxy-gas burners 100, as used in the manner of the present invention, was an increase in melting rate. Although this was not as great as that achieved with the oxy-oil self-atomizing tip mix burners 10 (described with reference to FIGS. 3A, 3B), it was nevertheless very significant.

The increase in the melting rate achieved will be better understood with reference to FIGS. 10, 11 and 12. These figures respectively show the melting rate in the cupola of FIG. 1, as indicated by the number of 5,000 pound charges melted per hour plotted against the volume flow rate of wind into the collective tuyeres, in standard cubic feet per minute multiplied by 1000; in each of three cases: FIG. 10 using no burners, FIG. 11 using oxy-gas burners at high firing rates, and FIG. 12 using oxy-oil burners at high firing rates. In each of the figures the points represent full hour periods without spills or wind changes; and method of average points was used to construct the line.

In FIG. 11 relating to the use of oxy-gas burners in the cupola, the maximum flow was 19,170 standard cubic feet per hour of natural gas and 28,410 standard cubic feet per hour of oxygen. These flows are equally divided among seven tuyere gas burners 100, substantially of the form indicated in FIGS. 6A, 6B, 6C. It was estimated that melting rate increases of approximately 25 percent were obtained using oxy-gas burners during periods of high burner firing rates.

In the plot of FIG. 12, which relates to the use of oxy-oil burners 10 of the type described with reference to FIGS. 3A, 3B in the tuyeres, the superiority of oil fuel over gas is immediately apparent. During the first trial the burners were fired using 189 gallons per hour of oil and 39,550 standard cubic feet per hour of oxygen. (This represents 75 percent of the stoichiometric requirement of oxygen for complete combustion of the fuel oil.) The melting rate increased so drastically that the wind flow rate of 8,000 to 9,000 standard cubic feet per minute flowing from wind box 11 into tuyeres 14, which is normally required to melt seven charges per hour with no burners, as shown in FIG. 10, had to be reduced to between 4,000 and 5,000 standard feet per minute to melt at the same rate, using oxy-oil burners 10 of the type described with reference to FIGS. 3A, 3B. This showed an increase of 90 percent or greater of the melting rate. Moreover, during periods of low metal requirements, it was found that the burners were effective in minimizing the adverse effects of wind spills, such as low metal temperatures and low carbon and silicon contents. After a temporary halt and wind spill, the furnace temperatures were rapidly returned to levels above 2,900 degrees Fahrenheit, using oxy-oil burners 10; and the average metal temperature during burner use was higher than that obtained without burners, even though the frequency and duration of the periods of wind spill were much greater.

In two additional tests, which were run at the beginning of a period of maximum casting production with a low level in the cupola or hearth, the cupola 1 was converted to a double charging practice which consisted of adding two splits of coke, limerock, spar and silicon to one bucket, followed by two buckets each with a 5,000 pound metallic charge. This procedure increased the capacity of the charging system and increased the packing in the shaft to reduce stack gas velocity.

The first of these tests employed a wind rate of 8,000 standard cubic feet per minute into the collective tuyeres 14. Oil flow was maintained at 210 gallons per hour, and oxygen was varied between 29,750 and 36,750 (51 percent and 62.5 percent, respectively, of the stoichiometric requirement for complete combustion). Whereas without burners, this wind rate would normally melt about seven and one-half charges per hour, during a measured hour in the instant test the furnace melted seven double charges, equivalent to fourteen single charges.

In the second of these tests, the wind rate was decreased from 8,000 to 7,000 standard cubic feet per minute. Oil flow was 210 gallons per hour and oxygen was introduced at the rae of 40,250 standard cubic feet per hour (68.4 percent of the stoichiometric requirement). The number of charges melted over a measured hour of burner use was six double charges, equivalent to twelve single charges. From these tests, it was evident that the productivity increase, at a wind rate of 8,000 standard cubic feet per minute into the collective tuyeres, was approximately 90 percent. Points representing each of these tests are indicated in FIG. 12 of the drawings. It is apparent from the figure that using the oxy-fuel burners in the manner described herein, with oxygen of about 75 percent of the requirement for complete combustion, the performance of the cupola greatly exceeds that of the condition in which the wind blast is used without the auxiliary burners.

Another advantage shown by the tests just described was a decrease of about 10 percent in the coke required; but, during these tests it did not appear that a very large reduction in coke would be advisable since a pick-up in the carbon content had been attempted. Moreover, charge changes had also been made during part of the period of the oxy-oil burner tests, which tended to restrict the amount of coke reduction possible.

Another advantage of the oxy-fuel burner techniques of the present invention is indicated in FIGS. 13A and 13B of the drawings, which plot frequencies of distribution against spout temperatures, for normal operation of the cupola without oxy-fuel burners, and for a similar period, using oxy-oil burners 10. The burners 10, operated in the manner previously described, used on an average 189 gallons per hour of oil and 39,550 standard cubic feet per hour of oxygen (75 percent of the stoichiometric requirement). In the burner operation, wind rates were reduced from between 8,000 and 9,000 standard cubic feet per minute, as in the normal operation, to between 4,000 and 5,000 standard cubic feet per minute. Spout samples indicated the presence of saturated iron in the product of the oxy-oil burner operation. Furthermore, silicon production from reduction of core sand in the charge was increased to above 3.0 percent in the product.

Further tests were made to determine whether the burners could be operated effectively with less than 100 percent oxygen. When the burner was started in the tuyere using only air, together with a cupola wind rate of 5,000 standard cubic feet per minute, the tuyere darkened and no flame was visible. When oxygen was then used to enrich the air until some burning became visible, it was found that the combination of 3,550 standard cubic feet per hour of air and 3,550 standard cubic feet per hour of oxygen (about 60 percent of the oxygen total required for stoichiometric combustion) would support combustion. It is apparent from these findings that it is more economical and generally satisfactory to operate the burner with 100 percent commercially pure oxygen at lower flow rates, than to introduce primary air into the combustion.

Another test was run in which straight oil injection without oxygen was also tried for a one hour period on all burners, using 210 gallons of oil per hour. During this test, the tuyeres darkened at once and the metal temperature dropped from 2,930 to 2,770 degrees Fahrenheit. Carbon content in the product dropped from 3.45 percent to 3.33 percent; and silicon content in the product dropped from 2.10 percent to 1.90 percent. This test tends to substantiate the conclusion that straight oxygen, or a higher blast temperature, is needed to offset the chilling effect to the furnace of straight fuel injection and that increased amounts of fuel injection require combustion through an oxy-fuel burner of the aforementioned design.

A further test using oxy-oil burners 10 in accordance with the present invention, as applied to molten iron making in a cupola of the general form indicated in FIG. 1, may be summarized as follows, with reference to Table III. The furnace, which has a water jacket (not shown), is fitted with water cooled copper tuyeres and is operated with a 1,200 degrees Fahrenheit wind blast. The burners 10, which were located in seven of the eight tuyeres, were self-atomizing tip mixers of the general form indicated in FIGS. 3A, 3B of the drawings. The fuel used was No. 2 fuel oil which was burned with commercially pure oxygen, according to the standards previously set forth.

TABLE III

| | Normal operation | Oxy-oil tuyere burners |
|---|---|---|
| Melting rate, tons per hour | 18.75 | 30.0 |
| Wind, standard cubic feet per minute | 8,000 | 8,000 |
| Coke, pounds per ton | 240 | 216 |
| Oil flow, gallons per hour | | 210 |
| Oxygen flow, standard cubic feet per hour | | 40,250 |
| Oxygen, stoichiometric percent of requirement | | 66.0 |

At an individual burner head, typical parameters are as follows: with the oxygen flow rate indicated in Table III, the pressure was 42 pounds per square inch absolute, temperature was 80 degrees Fahrenheit, with the oil flow as indicated, the pressure was 25 pounds per square inch absolute, temperature was 80 degrees Fahrenheit. The range of burner flame temperatures was 4,000 to 5,000 degrees Fahrenheit.

Table IV summarized a series of tests in an automotive factory, conducted on a water cooled cupola substantially of the form indicated in FIG. 1, in which normal operation is compared with operation in accordance with the present invention using oxy-oil burners 10, substantially as shown in FIGS. 3A, 3B, in seven of the seven symmetrically spaced water cooled tuyeres of the cupola. As in the prior tests the oil was No. 2 fuel oil (according to the standard of the American Society of Testing Materials); and oxygen was commercially pure grade.

TABLE IV

| | Normal operation | Oxy-oil burner use |
|---|---|---|
| Melting rate, tons per hour | 28–30 | 44 |
| Wind rate, standard cubic feet per minute | 14,500 | 11,800 |
| Coke, pounds per ton | 300 | 233 |
| Comparison of steel to iron scrap employed, indicated by ratio of carbon to oxygen in the charge | 45 | 52 |
| Oil flow, gallons per hour | | 170 |
| Oxygen flow, standard cubic feet per hour | | 59,000 |
| Oxygen, stoichiometric percent of oxygen required for complete combustion | | 120 |

As indicated in the previous example, typical parameters at the burner head at the flow rates indicated are: oxygen absolute pressure was 70 pounds per square inch, at 80 degrees Fahrenheit; oil absolute pressure was 40 pounds per square inch at 80 degrees Fahrenheit. Flame temperatures were within the range 4,000 to 5,000 degrees Fahrenheit.

In general, the type of furnace operation dealt with in the preceding discussion, involving the melting of pig iron and steel scrap to form molten iron in a cupola, contemplates the more or less complete combustion of the hydrocarbon fuel to form carbon dioxide, and water, according to the equation:

$$CH_4+20_2=CO_2+2H_2O \quad (1)$$

In this situation, optimum results are achieved by the use of an amount of oxygen as a combustant which is between 60 and 150 percent, or in preferred operation between 60 and 100 percent, by weight, of the stoichiometric quantity of oxygen required for complete combustion in the burner.

However, in other types of furnace operations the incomplete combustion or pyrolysis of the hydrocarbon fuel may be desired in a hypothetical reaction approximating the following:

$$CH_4+\tfrac{1}{2}O_2=2H_2+CO \quad (2)$$

This reaction contemplates the use of about 25 percent by weight of the stoichiometric quantity of oxygen required for complete combustion in the burner.

The following are analyses of gas samples taken at the combustion chambers of various rocket burners, operating to produce pyrolysis of hydrocarbon fuels consumed.

Of significance in these tests was the capability of the rocket burner to effect almost complete transformation of methane $CH_4$ to carbon monoxide CO and hydrogen $H_2$, as evidenced in tests #3 of Series #1.

The lower yields in Series #2 are explainable by the lower combustion chamber length-to-area ratio and possibly by higher rates of flow of oxygen and fuel.

TABLE V

| | $H_2$ | CO | $CO_2$ | $CH_4$ | $O_2$ | $N_2$ | A | Total |
|---|---|---|---|---|---|---|---|---|
| Series #1, 1" dia. x 8" comb. chamber | | | | | | | | |
| 1. 1,500 s.c.f.h. gas; 750 s.c.f.h. $O_2$[a] equals | 39.2 | 28.0 | 5.7 | 17.4 | | | | 90.3 |
| 2. 1,500 s.c.f.h. gas; 900 s.c.f.h. $O_2$[b] equals | 43.0 | 33.6 | 7.4 | 8.0 | | | | 92.0 |
| 3. 1,500 s.c.f.h. gas; 1,050 s.c.f.h. $O_2$[c] equals | 41.4 | 39.9 | 8.0 | 2.1 | | | | 91.4 |
| Series #2, 1½ dia. x 8" comb. chamber | | | | | | | | |
| 1. 7,480 s.c.f.h. gas; 6,150 s.c.f.h. $O_2$[d] equals | 25.7 | 17.13 | 4.11 | 48.5 | 0.11 | .65 | .05 | 96.25 |
| 2½" dia. x 12" comb. chamber: | | | | | | | | |
| 2. 7,480 s.c.f.h. gas; 6,150 s.c.f.h. $O_2$[d] equals | 29.6 | 18.59 | 3.93 | 44.3 | 0.13 | .51 | .05 | 97.11 |

[a] 25% stoichiometric.
[b] 30% stoichiometric.
[c] 35% stoichiometric.
[d] 41% stoichiometric.

In Series #2, $O_2$ and $H_2$ determinations were by mass spectrometer, balance by chromatograph.

A modification of the invention will now be described in which the oxy-fuel tuyere burners are incorporated into an iron smelting blast furnace in accordance with the teachings of the present invention.

In the iron ore smelting blast furnace shown in FIGS. 14 and 15, the tuyere burners 200 are disposed in tuyeres 314 substantially in the manner shown with reference to FIG. 2 of the drawings. In preferred form they may utilize natural gas fuel in the water cooled rocket burner 200 described in detail with reference to FIGS. 8A, 8B, 8C of the drawings and serviced by means of a piping system and an oxy-gas supply system substantially of the form shown and described with reference to FIG. 7. It will be understood, however, that both gas and oil can be simultaneously employed as fuels in a rocket burner in accordance with the design of FIGS. 8A, 8B, 8C, in which case the burner would be connected to an appropriate supply system which would combine the oil and gas supply systems of FIGS. 4 and 7. As other alternatives, the oxy-oil self-atomizing tip mix burner 10 of FIGS. 3A, 3B can be employed in the tuyeres 314 of the iron blast furnace of FIGS. 14 and 15, or the oxy-gas rocket insert 100 of FIGS. 6A, 6B, using the water jacket of FIGS. 3A, 3B. In each case an appropriate supply system according to FIGS. 4 or 7 would be employed.

Referring now to FIG. 14 of the drawings, there is shown an iron blast furnace of a conventional type suitable for use of oxy-fuel burners in accordance with the techniques of the present invention.

This comprises a foundation 302, which is 60 feet in diameter and 11 feet high, of concrete or the like, on which is supported a base or bottom portion 303, which comprises layers of firebrick built up to a level of 2 feet above the top of the foundation, and having an inner diameter of 24 feet. Surrounding the base or bottom portion is a substantially cylindrical wall 304 of firebrick, 36 inches thick, having an outer diameter of 30 feet, this portion rising to a height of 10 feet above the base portion and embracing what is known as the hearth. Notch 307, which opens off from the lower part of the hearth portion, is adapted to drain off the molten iron, whereas notch 306, at a slightly higher level, is designed to drain off the slag floating on top of the molten iron.

In the top of the hearth portion 305, symmetrically arranged in a horizontal plane about 9 feet above the base of the hearth 305, are a plurality of tuyere openings 314. In the present embodiment these number 20, and comprise, in each case, a frusto-conical opening in the brick wall 304 having a diameter 16 inches at the outer end and 10 inches at the inner end, at the inner end of which is mounted a metal tuyere **314*a* which is 10 inches in outer diameter, water cooled, and has ½ inch thick walls. Each of the blow-pipes 324 mounted inside of the tuyeres is 60 inches long and terminates a distance of 8 inches from the inner face of the brickwork tuyere opening 314. The blow pipes 324, which are formed of refractory lined steel, are downwardly inclined, each making an angle of about 10 degrees with the horizontal. These house oxy-fuel burners 200 which are located concentrically in the blow-pipes 324**, in the manner described generally with reference to the cupola embodiment shown in FIGS. 1 and 2 hereinbefore, and which will be described in greater detail hereinafter.

Referring to FIG. 15, which is an enlarged sectional showing of the tuyere and wind pipe area in the furnace of FIG. 14, the tuyere blow-pipes 324 are connected through a downcomer pipe **324*a* of steel sections which increases in inner diameter from about 10 inches at the inner connection to the tuyere blow-pipe 324, to 16 inches at the outer connection, where they each feed into a blast main or bustle pipe 311. The latter, which comprises a steel shell lined with firebrick to a thickness of about 18 inches, has an inner diameter of 4 feet and is supported in a frame so that it surrounds concentrically what is known as the "bosh" 309 of the blast furnace. The brick walls 308 of the bosh 309 taper outwardly from an inner diameter of 24 feet in a plane just above the plane of tuyeres 314, to an inner diameter of 28 feet in the plane of the main or bustle pipe 311**, a vertical height of 10 feet.

The bustle pipe 311 is connected through a system of conduits 312 including a brick or iron stove **313*a* for heating the blast by means of exhaust gases from the furnace, or in any other conventional manner. The blast originates in a conventional type reciprocating or turbine blower 313** designed to generate an air blast of the desired volume, velocity, and pressure.

Also surrounding the upper portion of bosh 309 is a concentric water pipe system 316 which cools the bosh and hearth areas. A plurality of vertical pipes **316*a*, which are connected to the concentric pipe system 316, deliver cooling water streams down past the bosh 309 and heater portions 305**, which pass out onto the foundation.

At the top of bosh 309 is an annular iron frame 317, called the mantle, built into the brickwork which supports the stack 315 about 56 feet high and tapering from a maximum inner diameter of 28 feet at the junction with the bosh 309, to an inner diameter of 19 feet at the throat 317. As in the lower portion, the stack 315 comprises a steel shell lined with firebrick to a thickness of about 27 inches. The upper end 320 of 317 is closed with a bell or cone 318 which serves to prevent the escape of gases from the stack. Above the bell 318 is the charging hopper 321, in which charge is placed for the purpose of dumping it into the furnace. In general the charge is conveyed up to the charging hopper by some type of a skip car, running on a track and operated by a system of pulleys, all of which is conventional, and not shown.

The steel pipes 322 which are 6 feet in inner diameter, serve as gas uptakes to carry off the exhaust gases which may be cleansed and passed through the stove **313*a* (in an arrangement not shown) to heat up the ingoing air blast in conduit 312**.

In accordance with the present invention, oxy-gas tuyere burners 200 of the form shown in FIGS. 8A, 8B, 8C, are employed in an iron ore smelting blast furnace, substantially of the type shown in FIGS. 14 and 15.

The tuyere burners 200 are mounted in all of the tuyeres **314*a*** in the blast furnace of FIG. 14. In the present example, these number 20, and each water cooled with a stream of water flowing in through the water jacket at a minimum pressure of 65 pounds per square inch absolute and a flow rate of 25 gallons per minute.

The burners 200 (FIGS. 8A, 8B, 8C), after being lighted in the manner described with reference to the cupola operation of FIG. 1, are operated in the example under description with commercially pure oxygen flowing into each of burner body heads 205 through coupling 223 at a flow rate of 5,000 standard cubic feet per minute, an absolute pressure of 30 pounds per square inch, and ambient temperature. Simultaneously, natural gas flows into the coupling 219 at a flow rate of 3,500 standard cubic feet per minute, an absolute pressure of 20 pounds per square inch, and ambient temperature.

The following table details the operation in the preferred mode:

TABLE VII

| | Control period | Burner period |
|---|---|---|
| Wind, to all burners, standard cubic feet per min | 72,000 | 68,000 |
| Smelting rate, tons of hot metal per day | 1,200 | 1,800 |
| Coke rate, tons for above number of tons of hot metal | 1,150 | 950 |
| Burner oxygen, to all burners, standard cubic feet per hour | 0 | 100,000 |
| Burner gas, to all burners, standard cubic feet per hour | 0 | 70,000 |
| Burner oil if used, to all burners gallons per hour | 0 | 450 |

In the iron-smelting blast furnace, typical burner flame temperatures lie within the range 3,000 to 5,000 degrees Fahrenheit; and, rocket burner flame velocities lie within the range 3,000 to 3,500 feet per second.

It will be apparent that the principles of the present invention are applicable to other types of furnaces than those described in the foregoing pages of the specification, including furnaces for smelting ores containing copper, lead, and antimony.

A typical rectangular lead blast furnace applicable to modification in accordance with the present invention is shown in FIG. 16 of the drawings, in front elevation, and in FIG. 17 in schematic section through the horizontal plane of the lower set of tuyeres.

The lead blast furnace of FIG. 16 comprises a foundation of firebrick, or the like, in which is formed a well or crucible 401, which narrows from a width of about four and one-half feet at its surface to four feet at the bottom, is six feet long, 20 to 36 inches deep, and serves to channel the molten lead derived from the smelting process. An outlet **403*b* serves to tap off molten lead from crucible 401; whereas the slag floating on top is drawn off through the outlet 407**.

Rising above the crucible 401 is the hearth portion 405 of the furnace, in the form of a rectangular iron box, having an inner dimension of say 5½ feet wide by 15 feet long. The vertical cast iron walls, three-eights inch thick, rise to a height of about 5 feet above the foundation 402. At the upper end of hearth 405, the cast iron walls 408 continue to extend upwardly to form the bosh 409, which has an inner dimension of roughly the same as the hearth portion, or slightly larger. The walls of the bosh 409 rise, substantially vertically, for about 3½ feet. A framework of supporting bars support the upper combustion section 416 which broadens out from a width of about 5½ feet and length of 15 feet, at its lower end, to a slightly greater width in a rise of about seven feet. This entire lower section of the furnace is water jacketed in a casing of cast iron one-half inch thick, forming the inner walls of the furnace. The upper combustion section 416 terminates in a brick stack 415 which rises to a substantial height above the foundation and is supported by a framework including columns 420.

The furnace may be equipped with two separate sets of tuyere pipes **414*a*, 414*b*, each 3 inches in inner diameter, which pass horizontally, or with slight declination, through the furnace walls. The lower set of tuyeres 414*b* is located in the hearth area, about one foot above the crucible. The tuyeres in this set number 16, spaced approximately 12 inches apart in the east and west walls of the hearth area (see FIG. 17). There may also be tuyeres on the north and south walls (not shown). There may also be a second set of tuyeres, 414*a***, similarly spaced to the lower set, entering the furnace in the bosh area, several feet above the lower set. These latter tuyeres may also number 16 each in the east and west walls; and there may also be tuyeres at this level in the north and south walls (not shown).

The tuyeres **414*a* and 414*b*, at both levels, each have connecting downcomer pipes 424*a* and 424*b*, which are respectively connected to an upper bustle pipe 411*a*, and a lower bustle pipe 411*b* surrounding the furnace. Each of the bustle pipes 411*a* and 411*b*** is connected through respective conduits to an air compressor (not shown) as described with reference to the previous figures.

In accordance with the present invention, burners of any of the types previously described may be placed in the furnace at the level of tuyeres **414*b* with highly beneficial results to the production of lead, preferably, within alternate tuyeres 414*b*. In certain modifications, the burners may alternatively be interposed directly into the walls of the furnace, or in the front or back tuyeres, or in the tuyeres 414*a***, also with beneficial results to the process.

In the preferred embodiment which will be described, the orientation of the burners in the furnace is substantially as indicated schematically in FIG. 17, which is a plan view of the lead blast furnace of FIG. 16, including burners in alternate tuyeres **414*b***, in the east and west walls. As indicated in FIG. 17, the separation between adjacent burners of each side of the furnace is approximately 2 feet. In preferred arrangement, the burners on the two sides of the furnace are placed in staggered relation, so that in each case the burner on one side faces an empty tuyere on the side across the furnace.

FIG. 18 shows a section of the furnace wall of FIG. 16, indicating the location of the burners 428 in the tuyeres **414*b*. The inner and outer walls of the lead blast furnace of FIG. 16 are spaced apart 6 inches. The tuyere pipes 414*b*, which penetrate through the thickness of the double wall are 3½ inches in outer diameter, one-quarter of an inch thick, and 16½ inches long, including the tuyere pipe extension 424. They may be tilted slightly downward at an angle of, say, 5 degrees. If the tuyere pipe is horizontal, the tuyere burner is positioned at a slight declination (about 5 degrees) to the longitudinal axis of the tuyere. On the other hand, if the tuyere pipe has a downward inclination, the burner is placed concentric with the longitudinal axis. The center of the tuyere pipe may protrude into the interior of the furnace a slight distance. At its outer end, the tuyere pipe 414*b* terminates in a flange, to which is attached the matching flange of a tuyere extension pipe 424, of 3 inches inner diameter, which extends outwardly a distance of 12 inches. Connected to tuyere extension pipe 424 is the downcomer pipe 424*b* leading to the air main 411*b*. The outer end of tuyere extension pipe 424 is closed by a cover plate 425, in substantially the manner of extension pipe 24** of FIG. 2, described with reference to the iron melting cupola.

Fitted concentrically into the 3 inch inner diameter tuyere pipe **414*b* and extension pipe 424, is a rocket burner 428 of the form indicated in FIGS. 19A, 19B of the drawings. The inner end of the burner 428 is preferably recessed a distance of about 6 inches from the inner end of tuyere pipe 414*b***, to the outer limit of the water jacketing in the tuyere.

Because of the small size of the tuyeres **414*b* of the lead blast furnace, the burners are much smaller in diameter than those previously described. The water jacket in the present burner embodiment comprises two concentric copper pipes, the outer pipe 430 being one and five-eighths inches in outer diameter, 0.072 inch in wall thickness, and twenty and three-eighths inches long; and, the inner pipe 438 being one and one-eighth inches in outer diameter, 0.065 inch in wall thickness, and 24 and three-quarters inches long. The foregoing concentric pipes 430 and 438 are flush at their inner ends, which are sealed together internally with a conventional annular plug 439, which fits between the inner periphery of pipe 430 and the outer periphery of pipe 438**, and extends one-quarter inch inward in an axial direction.

Pipes 430 and 438 are maintained in concentric array by means of two pairs of copper rods **447*a*, 447*b*, each 3/16 of an inch in diameter, and disposed lengthwise in the annular space between the two pipes at 90 degree separations in the cross-sectional plane and brazed to the outer surface of pipe 438. The longer pair 447*b*** is twenty and three-fourth inches long, and terminates 5/8 of an inch from the inner end of the water jacket. The shorter pair is 3/4 of an inch long, and terminates 2 inches from the inner end of the water jacket.

Concentric pipes 430 and 438 are fitted at their outer ends into a cylindrical burner breech assembly 432, which is 2½ inches in outer diameter and 4 inches long. Burner breech assembly 432 has water inlet and outlet connections 435 and 436, respectively, which tap into the channel between copper tubes 430 and 438. Water inlet and outlet connections 435 and 436 are connected to a conventional water manifold (not shown).

Inside of the burner barrel, 6 inches from inner end 431, is centered a cylindrical gas tube adapter 440. Concentrically fitted into one end of adapter 440 is an axial gas conduit 442 of stainless steel, one-half inch in outer diameter, 0.35 inch in wall thickness, and 19 inches long, which is axially disposed in the burner barrel and fits at its outer end into a central opening of the burner breech assembly 432, where it communicates with the connector 450 leading to a gas supply system of the type shown in FIG. 7. Oxygen connection 434, which taps into the annular space between inner tube 438 and central gas conduit 442, is connected to an oxygen supply system substantially of the type shown in FIG. 7.

The inner end of adapter 440 accommodates a bundle of 5 stainless steel tubes 437, symmetrically arranged with reference to the longitudinal axis of the burner barrel, each three-sixteenths inch in outer diameter, 0.02 inch in wall thickness, and five and three-eighths inches long. These fit into accommodating bores **441*a* in the cylindrical stainless steel burner block element 441, which fits into inner tube 438 with its inner end about 3 inches from the inner end of the tube. Bores 441*a*** containing the gas orifices lie on a circle one-half inch in diameter.

In addition, burner block element 441 contains an inner circle one-quarter inch in diameter of 5 oxygen orifices **441*b*, each three-thirty-seconds inch in diameter, located between adjacent gas orifices 441*a*; and, an outer circle thirteen-sixteenths of an inch in diameter of 10 oxygen orifices 441*c***, also three-thirty-seconds of an inch in diameter.

It will be appreciated that although in the specific example of the lead blast furnace described, an oxy-gas rocket burner has been employed, in accordance with the present invention, other types of burners, such as self-atomizing tip mixers employing oil as a fuel, with oxygen as a combustant, or rocket burners employing a combination of gas and oil as a fuel, with oxygen as a combustant, could be substituted for use in the lead blast furnace.

It is contemplated that the furnace of FIG. 16 will be operated for lead smelting, using as charge a sinter of the general composition indicated in Table VIII below.

TABLE VIII

Sinter (percent by weight)

Pb, 34.5; Cu, 2.1; As, 1.0; Sb, 1.4; S, 1.7.

An example of operation of the lead blast furnace of FIG. 16, in accordance with the present invention, employing only five burners interposed into the furnace walls, including front and back, at the lower tuyere level, instead of 16 tuyere burners, disposed in the manner disclosed in the preferred embodiment, was as follows:

TABLE IX

| | Control period | Burner period |
|---|---|---|
| Wind, standard cubic feet per minute | 6,780 | 6,780 |
| Smelting rate, sinter tons per day | 580 | 695 |
| Coke charges, tons per day | 56 | 42 |
| Burner oxygen, per burner, standard cubic feet per hour | | 6,000 |
| Burner natural gas, per burner, standard cubic feet per hour | | 5,250 |

The aforesaid data indicate an average increase in production of 20 percent (although at times as much as 100 percent increase is obtained) with a concurrent coke saving of 25 percent, using a burner arrangement which was less adequate than the preferred arrangement disclosed with reference to FIGS. 16, 17, 18, and 19.

In operating the burner system described with reference to the foregoing FIGS. 16, 17, 18, and 19, the following parameters are suggested for preferred operation:

TABLE X

| | |
|---|---|
| Wind (standard cubic feet per minute) | 7000 |
| Burner oxygen (per burner) (s.c.f.h.) | 525 |
| Velocity, in feet per second, of gas flow at the burner heads (at absolute pressure of 35 pounds per square inch and temperature of 70 degrees Fahrenheit) | 600 |
| Burner natural gas (per burner) (s.c.f.h.) | 750 |
| Velocity, in feed per second, of gas flow at the burner heads at absolute pressure of 30 pounds per square inch and temperature of 70 degrees Fahrenheit | 300 |
| Average flame velocity in burners (feet per second) at flame temperatures within the range 3200 to 4000 degrees Fahrenheit | 2500–3000 |

A further example of the application of the oxy-fuel burner system of the present invention is to the antimony blast furnace.

In general, the configuration of the antimony blast furnace is substantially similar to that of the lead blast furnace shown in FIG. 16, although there may be variations in scale and minor variations in shape.

The antimony furnace in one operating example is 40 inches by 72 inches in the plane of the tuyeres, which plane is located 8 inches above the base of the hearth. There are 16 tuyeres, each 2½ inches in inner diameter, symmetrically disposed on each of the two opposing 72-inch sides. The burner arrangement is substantially similar to that shown in FIG. 17, with burners located in alternate tuyeres on opposite 72-inch sides of the furnace, in staggered arrangement, so that each burner faces an empty tuyere.

The burners employed in the antimony furnace may be rocket burners substantially of the form and dimensions described with reference to FIGS. 19A, 19B of the drawings, except that they are preferably formed of stainless steel instead of copper, as disclosed with reference to the lead blast furnace. Moreover, it may be necessary to reduce the dimensions of the burners slightly in view of the slightly smaller tuyeres. Furthermore, it will be understood that as in the case of the lead blast furnace, self-atomizing tip-mixer oxy-oil burners may be substituted for the rocket burner shown in FIGS. 19A, 19B; and, rocket burners using a combination of gas and oil for fuel may be substituted for those exclusively employing gas, as shown.

The antimony smelting operation using oxy-fuel burners in accordance with the present invention is practiced using charge of the typical composition shown in Table XI.

TABLE XI

Charge Composition (percent by weight)

Rough ore comprising 30% antimony; remainder:
Silicon dioxide ($SiO_2$),
Aluminum oxide ($Al_2O_3$), and
Calcium oxide (CaO).
Briquettes comprising 35% antimony; remainder:
Silicon dioxide ($SiO_2$),
Aluminum oxide ($Al_2O_3$), and
Calcium oxide (CaO).
Slag and Dross comprising 40%–45% Antimony (Sb); remainder: fused material comprising substantially the composition of the rough ore and briquettes.

TABLE XII

Requirements for processing a charge of antimony in accordance with the present invention:

Coke—600 lbs.
Ore—1500 lbs.
Briquettes—1500 lbs.
Refinery Dross (includes return slag)—700 lbs.
Iron Ore—400 lbs.
Limestone and siliceous ore—60 lbs.
Air (Unheated)—2500 s.c.f.m. (total for 16 tuyeres)
[1]Oxygen—2000 s.c.f.h.
[1]Natural Gas—2000 s.c.f.h.

[1] This provides 50% of the stoichiometric quantities required for complete combustion of fuel.

Typical flame temperatures using rocket burners in the above-described antimony smelting operation, are within the range 3,200 to 4,000 degrees Fahrenheit; and the flame velocities within the range, 1,000 to 2,000 feet per second, at these temperatures.

The principal products of the aforesaid combustion are hydrogen ($H_2$) and carbon monoxide (CO), at smelting temperatures of 3,500 degrees Fahrenheit and metal and slag temperatures of 2,300 degrees Fahrenheit.

Using oxy-fuel burners to carry out an antimony smelting operation in accordance with the present invention, as aforesaid, a 20 percent coke reduction was realized with a 45 percent ore through-put rate increase.

To recapitulate, a salient feature of each of the disclosed embodiments of the present invention is that oxy-fuel burners, which are introduced into a metal processing furnace of the shaft type at the tuyere level, are operated with high velocity streams of a hydrocarbon fuel and oxygen, the latter in pure rather than in mixed form. In every case, combustion takes place in the tuyere or burner barrel, in a single, homogeneous, high-velocity coherent flame having an established combustion zone which originates at and is seated in the burner. In the case of rocket burners, the flame velocity is within the range 1,000 to 3,500 feet per second, and flame temperature within the range 3,000 to 5,000 degrees Fahrenheit. Self-atomizing tip mixers have flame velocities ranging from 500 to 1500 feet per second within this range of temperatures. The successful tuyere burner design for the purposes of the present invention is a post-mix type with a configuration of oxygen and fuel ports such as to give flame stability within the tuyeres at fuel and oxygen velocities ranging from 10 feet per second to supersonic velocities. The high velocity flame provides turbulence which completely mixes the combustion products before they enter the furnace in a hot, homogeneous, high-velocity stream. In accordance with actual practice, the oxygen used in the burners varies from 27 to 300 percent by weight of the stoichiometric requirement for complete combustion of the burner fuel. The heat output of each of the burners in British Thermal Units varies from 600,000 to 10,000,000. When the burners are mounted in water cooled tuyeres, the end of the burner is preferably withdrawn from the end of the tuyere to the maximum distance of water cooling in the tuyere. In installations in which the burner is not water cooled, the tip is preferably withdrawn from one to six inches from the hot inner face of the furnace lining.

In the iron melting cupola, for preferred operation oxy-oil burners of the self-atomizing tip mix type are employed in the tuyeres. Using this type of burner, flame velocities are preferably of from 500 to 1500 feet per second at flame temperatures within the range 4000 to 5000 degrees Fahrenheit. The cupola burners use commercially pure oxygen in an amount within the range 60 to 150 percent by weight of the stoichiometric requirement for complete combustion, and preferably within the range 60 to 100 percent. In cupola operation, it is preferred that complete combustion take place in the tuyeres or burners, giving rise to carbon dioxide and water as the principal burner combustion products.

In the iron-ore smelting blast furnaces, either gas or oil, or a combination of the two are preferably employed in a rocket type burner, using oxygen as a combustant in an amount within the range 25 to 100 percent by weight of the stoichiometric requirement for complete combustion, and preferably, within the range 25 to 50 percent. Flame velocities, employing the rocket burners are within the range 1,500 to 3,500 feet per second, at flame temperatures within the range 3,000 to 5,000 degrees Fahrenheit. The principal object of burner operation in the iron blast furnace is pyrolysis of the fuel, creating hydrogen and carbon monoxide as burner combustion products, thereby providing a reducing environment within the furnace. One of the specific features of the present invention is the adjustability of the burners to fit the burner combustion products to the specific requirements of the furnace operation.

In both the iron cupola and iron blast furnace, the tuyeres are preferably of the downwardly inclined water cooled type. Moreover, wind from the blast or bustle pipe surrounding the furnace may be passed around the peripheries of those tuyeres in which burners are mounted. Preferably, the flame velocity in each of the burners at least exceeds the wind velocity in the surrounding tuyeres, in order to provide a stable seated flame. However, alternatively, the water cooled burners can be operated without wind.

In the lead and antimony furnaces, in which reduction of the ore is the principal object, oxy-gas burners of the rocket type are preferred, with commercially pure oxygen being supplied to the burners preferably in an amount between 35 and 50 percent of the stoichiometric requirement for complete combustion. The flame temperatures in both lead and antimony furnace burners are within the range 3,200 to 4,000 degrees Fahrenheit. Flame velocities at these temperatures in the lead furnace burners are within the range 2,500 to 3,000 feet per second; and in the antimony furnace burners, flame velocities are the same using rocket burners and are within the range 1,000 to 2,000 feet per second, using burners of the self-atomizing tip-mixer type.

It will be understood, however, that either oxy-oil or oxy-gas burners of the self-atomizing-tip-mix type, or of the rocket burner types, such as disclosed herein, or such as disclosed, for example, in T. L. Shepherd U.S. Pat. No. 3,092,166 issued June 4, 1963, or in W. B. Moen et al. U.S. Pat. No. 3,135,626, issued June 2, 1964, can be employed beneficially in any of the many types of shaft melting or smelting furnaces, including those which may differ from the furnaces specifically disclosed herein by way of illustration. Moreover, the present invention is not limited to the specific forms disclosed herein by way of illustration, but is defined in the scope of the appended claims.

I claim:

1. In the method of processing metal-bearing charge in a furnace having a shaft portion, a hearth portion and a plurality of oxy-fuel burners positioned in tuyeres in the walls of said furnace adjacent to said hearth portion which comprises the steps of introducing a composite of said charge and coke into the shaft portion of said furnace, subjecting said composite to a process comprising heat and chemical action in said hearth portion to form a molten metal product, and drawing off said product and the residue of said process from said hearth portion, the improvement which comprises:

supplying said burners with separated streams of commercially pure oxygen and hydrocarbon fluid fuel, wherein said streams of commercially pure oxygen take the form of a plurality of high velocity jets in each of said burners which emerge surrounding one or more streams of said hydrocarbon fluid fuel, post-mixing said streams to produce a turbulent mixture at the tips of said burners, utilizing said turbulent mixture to sustain a stable, homogeneous, coherent flame in an established combustion zone at each of said burner tips, said flame having a temperature within the range of from 3,000 to 5,000° F. and having a flame velocity of from 500 to 3,500 feet per second at a flame temperature within said aforementioned temperature range, and supplying said tuyeres from a blast main with air to produce an air blast velocity in the tuyeres in the range of from 150 to 1,000 feet per second during the operation of said burners, the velocity of the flame of each of said burners at least exceeding the velocity of said blasts of air in said tuyeres.

2. The method in accordance with claim 1 wherein said commercially pure oxygen flows in each of said burners at a mass flow rate of from one-quarter to twice the stoichiometric quantity required for complete combustion of said fuel flowing in said burner.

3. The method in accordance with claim 2 for melting iron in a cupola wherein said stream of oxygen flows in each of said burners at a mass flow rate within the range 60 to 100 percent of the stoichiometric quantity required for complete combustion of said fluid fuel flowing in said burner.

4. The method in accordance with claim 3 for melting iron in a cupola wherein the velocity of the flame of each of said burners is within the range of 500 to 1,500 feet per second at a flame temperature within the range 4,000 to 5,000 degrees Fahrenheit.

5. The method in accordance with claim 2 for smelting ore in a blast furnace wherein the mass rate of flow of said stream of oxygen is within the range 25 to 100 percent of the stoichiometric quantity required for complete combustion of said fluid fuel in said burner.

6. The method in accordance with claim 5 for smelting ore containing a principal component of iron in a blast furnace wherein the velocity of the flame of each of said burners is within the range 1,500 to 3,500 feet per second at a flame temperature within the range 3,000 to 5,000 degrees Fahrenheit.

7. The method in accordance with claim 5 for smelting in a blast furnace ore containing a principal component selected from the group of metals consisting of lead and antimony wherein the mass rate of flow of said stream of oxygen is within the range 35 to 50 percent of the stoichiometric quantity required for complete combustion of said fluid fuel in said burner.

8. The method in accordance with claim 7 wherein the velocity of the flame of each of said burners is within the range 1,000 to 3,000 feet per second at a flame temperature within the range 3,200 to 4,000 degrees Fahrenheit.

9. The method in accordance with claim 1 wherein said hydrocarbon fluid fuel comprises as a principal component oil including between 9 and 14 percent by weight of hydrogen and between 85 and 91 percent by weight of carbon.

10. The method in accordance with claim 1 in which said hydrocarbon fluid fuel comprises as a principal component natural gas.

References Cited

UNITED STATES PATENTS

| | | | |
|---|---|---|---|
| 325,293 | 9/1885 | Weber | 75—42 |
| 985,394 | 2/1911 | Case | 266—41X |
| 3,175,817 | 3/1965 | Smith et al. | 266—34.1 |
| 3,317,309 | 5/1967 | Rinesch | 75—43 |
| 370,251 | 9/1887 | Field | 266—41X |
| 1,393,749 | 10/1921 | Carstens | 75—42 |
| 1,507,740 | 9/1924 | Kirby | 75—42X |
| 1,515,906 | 11/1924 | Steel | 75—42 |
| 2,140,181 | 12/1938 | Bangle | 266—41X |
| 2,605,180 | 7/1952 | Totzek | 266—41X |
| 2,719,083 | 9/1955 | Pomykala | 75—42 |
| 3,062,640 | 11/1962 | Agarwal et al. | 75—42 |
| 3,076,642 | 2/1963 | Dhenein | 266—41 |
| 3,089,766 | 5/1963 | DeWald et al. | 75—43 |
| 3,232,595 | 2/1966 | Balster | 75—43X |
| 3,239,331 | 3/1966 | Menk et al. | 75—42 |

FOREIGN PATENTS

| | | | |
|---|---|---|---|
| 1,259,738 | 3/1961 | France | 75—42 |

H. W. TARRING, Primary Examiner

U.S. Cl. X.R.

75—43; 266—29, 41